United States Patent [19]
Yasuda

[11] Patent Number: 5,957,991
[45] Date of Patent: Sep. 28, 1999

[54] VEHICLE DRIVE TORQUE CONTROLLER

[75] Inventor: Sota Yasuda, Isehara, Japan

[73] Assignee: Nissan Motor Co., Ltd., Yokohama, Japan

[21] Appl. No.: 08/834,280

[22] Filed: Apr. 15, 1997

[30] Foreign Application Priority Data

Apr. 15, 1996 [JP] Japan .................................. 8-092567
Apr. 15, 1996 [JP] Japan .................................. 8-092568

[51] Int. Cl.⁶ .................................................. B60K 28/16
[52] U.S. Cl. ............................... 701/84; 701/85; 701/90; 180/197
[58] Field of Search ................................... 701/84, 85, 86, 701/90, 82; 180/197; 303/139, 145

[56] References Cited

U.S. PATENT DOCUMENTS

| | | |
|---|---|---|
| 4,625,824 | 12/1986 | Leiber ...................................... 180/197 |
| 5,018,595 | 5/1991 | Hara et al. ............................... 180/197 |
| 5,070,461 | 12/1991 | Nobumoto et al. ................ 364/426.03 |
| 5,159,990 | 11/1992 | Abe et al. ................................ 180/197 |
| 5,328,006 | 7/1994 | Tsuyama et al. ....................... 477/185 |
| 5,564,796 | 10/1996 | Saito et al. .............................. 303/112 |
| 5,682,316 | 10/1997 | Hrovat et al. ..................... 364/426.029 |

FOREIGN PATENT DOCUMENTS 4-55156 2/1992 Japan .

*Primary Examiner*—Michael J. Zanelli
*Attorney, Agent, or Firm*—Foley & Lardner

[57] ABSTRACT

The drive wheels of a vehicle are connected to an engine via a torque converter and racing of the drive wheels during starting of the vehicle and subsequent acceleration is prevent by reducing the torque of the drive wheels according to the driving state of the vehicle. A slip factor of the torque converter is computed, and a lower limit of the torque is set based on the slip rate. Insufficient acceleration after starting is avoided by preventing the torque of the drive wheels from falling below this lower limit.

6 Claims, 22 Drawing Sheets

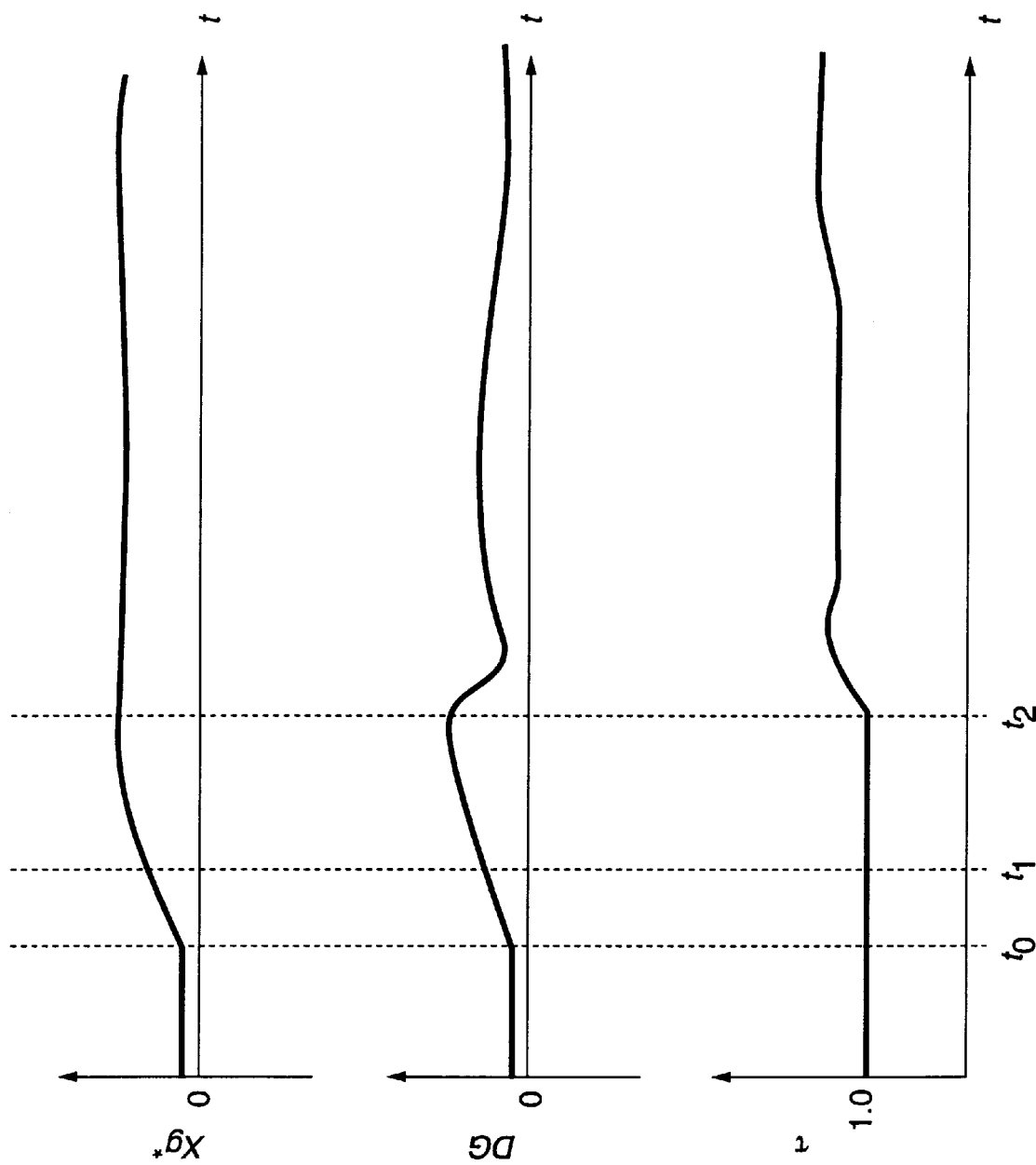

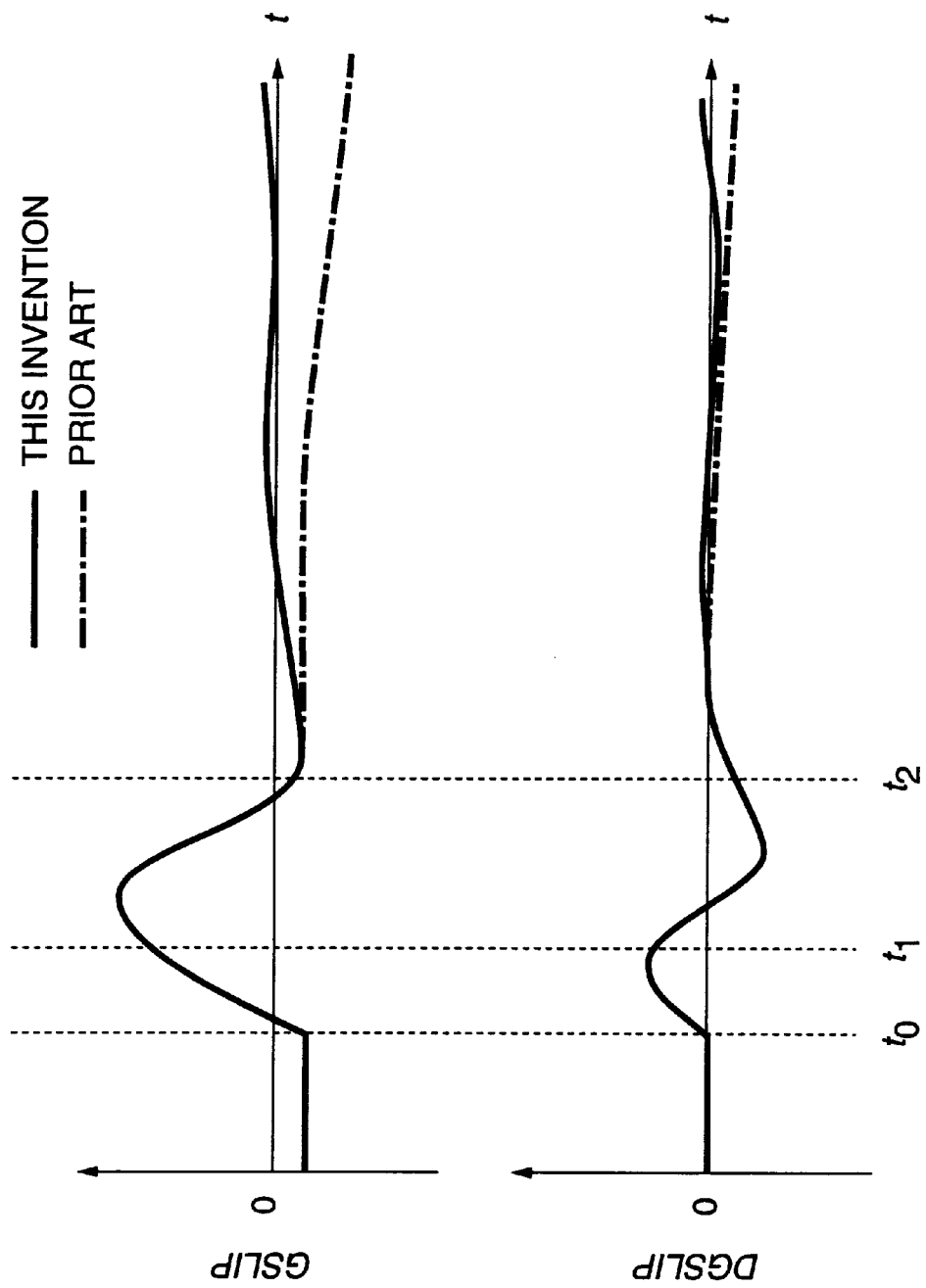

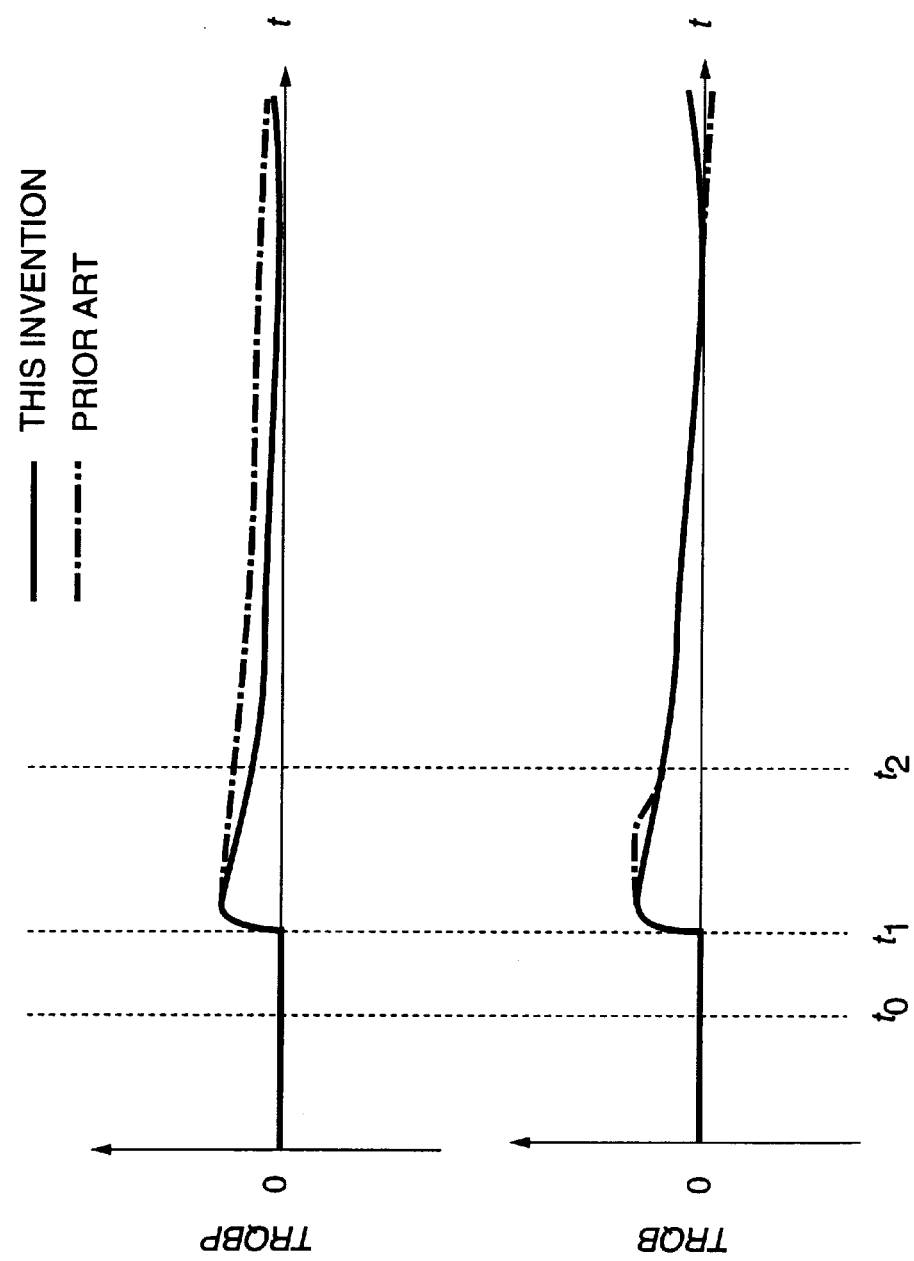

VEHICLE DRIVE TORQUE CONTROLLER

FIELD OF THE INVENTION

This invention relates to a vehicle drive torque controller that prevents racing of drive wheels, for example when a vehicle accelerates, by reducing the drive torque of the drive wheels.

BACKGROUND OF THE INVENTION

A mechanism for reducing a drive wheel torque according to racing of the drive wheels so as to prevent loss of acceleration performance is known as a drive torque controller or traction control system.

It is also known that the frictional coefficient $\mu$ of a road surface influences the slip factor of the drive wheels. In this connection, Tokkai Hei 4-55156 published by the Japanese Patent Office in 1992, discloses a device which estimates the frictional coefficient $\mu$ from the vehicle acceleration.

In this device, the estimation accuracy of the frictional coefficient $\mu$ is improved by using an acceleration in a predetermined short time and an acceleration in a predetermined long time according to the accelerating state of the vehicle. Also, the slip factor of the drive wheels is limited to a permitted range by, for example, decreasing the engine output according to the frictional coefficient $\mu$ of the road surface.

In this drive torque controller, however, a problem arises if the drive wheels race when there is a large resistance to vehicle motion or on a road surface with high resistance, such as for example a rising slope with a high frictional coefficient $\mu$. This is because, when drive torque is reduced on a rising slope, the engine rotation cannot increase due to the large resistance to vehicle motion, and sufficient acceleration cannot be obtained. Also, some time is required for the drive torque to return its original level. As a result, some time is needed to reach a predetermined acceleration, and in addition to the loss of acceleration performance, the driver experiences discomfort.

SUMMARY OF THE INVENTION

It is therefore an object of this invention to avoid excessive decrease of drive torque of the drive wheels by a drive torque controller when there is a large resistance to vehicle motion.

In order to achieve the above object, this invention provides a drive torque controller for use with a vehicle which has a drive wheel connected to an engine via a torque converter. The controller comprises a mechanism for detecting a running state of a vehicle, a mechanism for reducing a drive torque of the drive wheel based on the running state, a mechanism for computing a slip factor of the torque converter, a mechanism for setting a lower limit of the drive torque based on the slip factor, and a mechanism for preventing the reducing mechanism from reducing the drive torque to a value lower than the lower limit.

It is preferable that the lower limit setting mechanism comprises a mechanism for computing a road surface frictional coefficient based on the slip factor, and a mechanism for setting the lower limit according to the road surface frictional coefficient.

It is also preferable that the lower limit setting mechanism comprises a mechanism for detecting racing of the drive wheel, and a mechanism for fixing the lower limit for a predetermined time from when racing is detected.

It is also preferable that the driving state detecting mechanism comprises a mechanism for detecting an acceleration of the vehicle, and the lower limit setting mechanism comprises a mechanism for computing a target drive torque based on the acceleration and a mechanism for applying a larger value of the target drive torque or a lower limit of drive torque based on the slip factor, as the lower limit.

This invention also provides a drive torque controller comprising a mechanism for detecting a running state of the vehicle, a mechanism for calculating a target drive torque of the drive wheel based on the running state, a mechanism for controlling an engine output so as to obtain the target drive torque, a mechanism for detecting an acceleration of the vehicle, a mechanism for detecting the engine output, and a mechanism for correcting the target drive torque so that the acceleration corresponds to the engine output.

It is preferable that the correcting mechanism comprises a mechanism for calculating an estimated acceleration of the vehicle on a flat road from the engine output, and a mechanism for correcting the target drive torque based on a difference between the estimated acceleration and the acceleration detected by acceleration detecting mechanism.

It is also preferable that the running state detecting mechanism comprises a mechanism for detecting a rotation speed of the drive wheel, and the target drive torque calculating mechanism comprises a mechanism for computing a feedback term of the target drive torque based on the rotation speed, a mechanism for computing a feedforward term of the target drive torque based on the acceleration, and a mechanism for obtaining the target drive torque from the sum of the feedforward term and the feedback term.

The details as well as other features and advantages of this invention are set forth in the remainder of the specification and are shown in the accompanying drawings.

DESCRIPTION OF THE PREFERRED EMBODIMENTS

Figure 1:
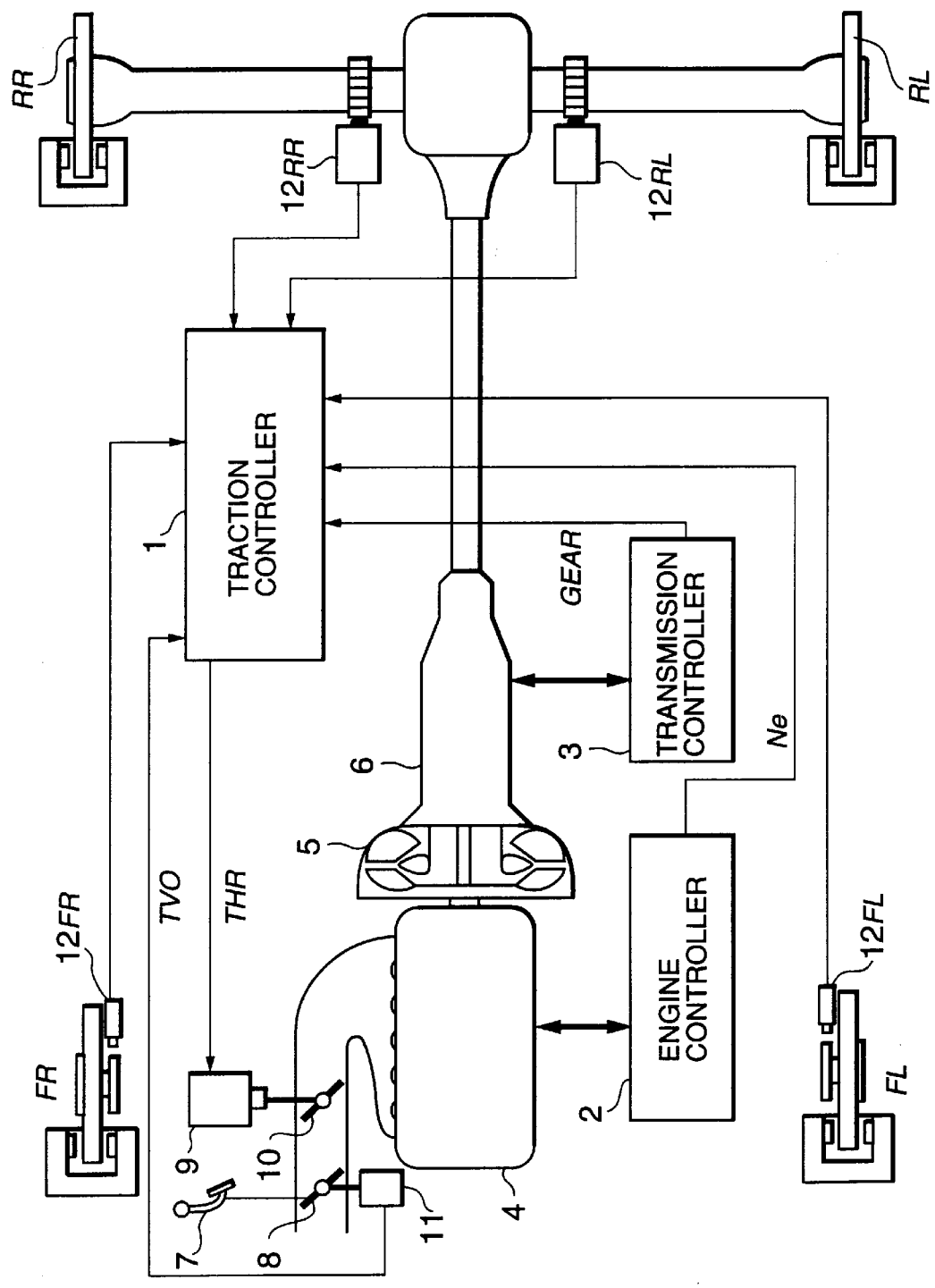
FIG. 1 is a schematic diagram of a drive torque control device according to this invention.

Referring to FIG. 1 of the drawings, an engine 4 of a vehicle is connected to an automatic transmission 6 through a torque converter 5.

A fuel injection amount or ignition timing of the engine 4 is controlled according to the driving state of the engine 4 by an engine controller 2.

A first throttle 8 operated in response to an accelerator pedal 7 and a second throttle 10 driven by an actuator 9 are disposed in series in an intake passage of the engine 4.

The automatic transmission 6 is connected to rear wheels RR and RL via a drive shaft.

In the following description, the left and right rear wheels RL, RR are the drive wheels, and the left and right front wheels FL, FR are the driven wheels. The automatic transmission 6 is set to a gear ratio or speed change ratio according to the driving state by a transmission controller 3.

The actuator 9 which drives the second throttle 10 of the engine 4 is controlled by a traction controller 1. The second throttle 10 is a throttle for controlling drive torque reduction on the basis of the slip factor of the drive wheels and when this control is not being performed, it is always maintained fully open including when the engine is in the idle state.

An engine rotation speed Ne which is output as a signal from the engine controller 2 and a gear position GEAR of the automatic transmission 6 which is output as a signal from the transmission controller 3 are respectively input to the traction controller 1.

Detection signals are also input from a throttle opening sensor 11 which detects an opening TVO of the first throttle 10, and from wheel speed sensors 12FR, 12FL, 12RR, 12RL which detect the rotation speed of the wheels or axles.

Based on the wheel speeds VTFR, VTFL, VTRR, VTRL, the traction controller 1 detects racing of the drive wheels RR, RL and a front/rear acceleration Xg of the vehicle. When the drive wheels RR, RL are racing, the opening of the second throttle 10 is reduced via the actuator 9, and racing of the drive wheels is suppressed by reducing the drive torque of the engine 4.

Figure 2A:
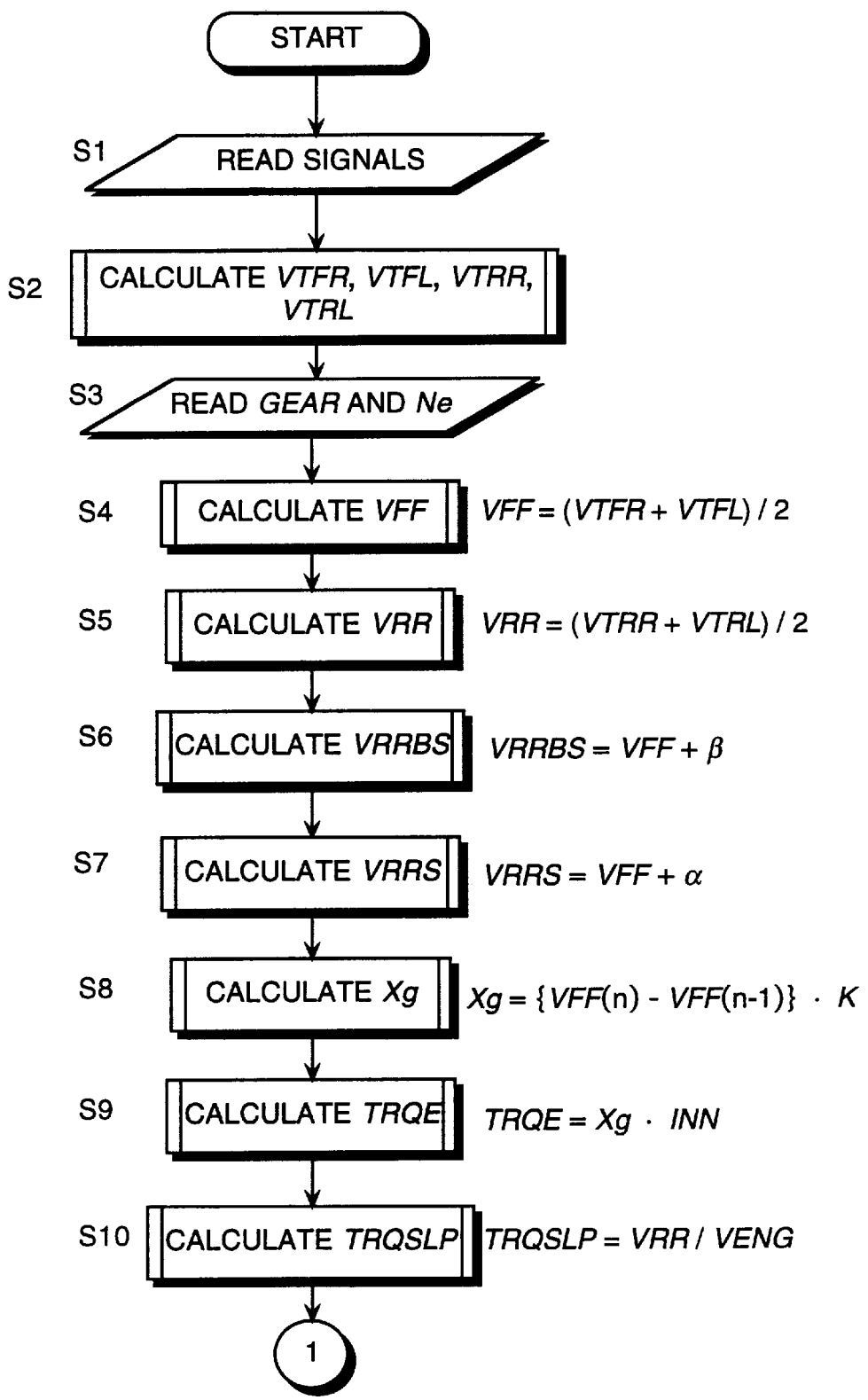
FIGS. 2A–2C are flowcharts describing a drive torque control process performed by a traction controller according to this invention.
Figure 2B:
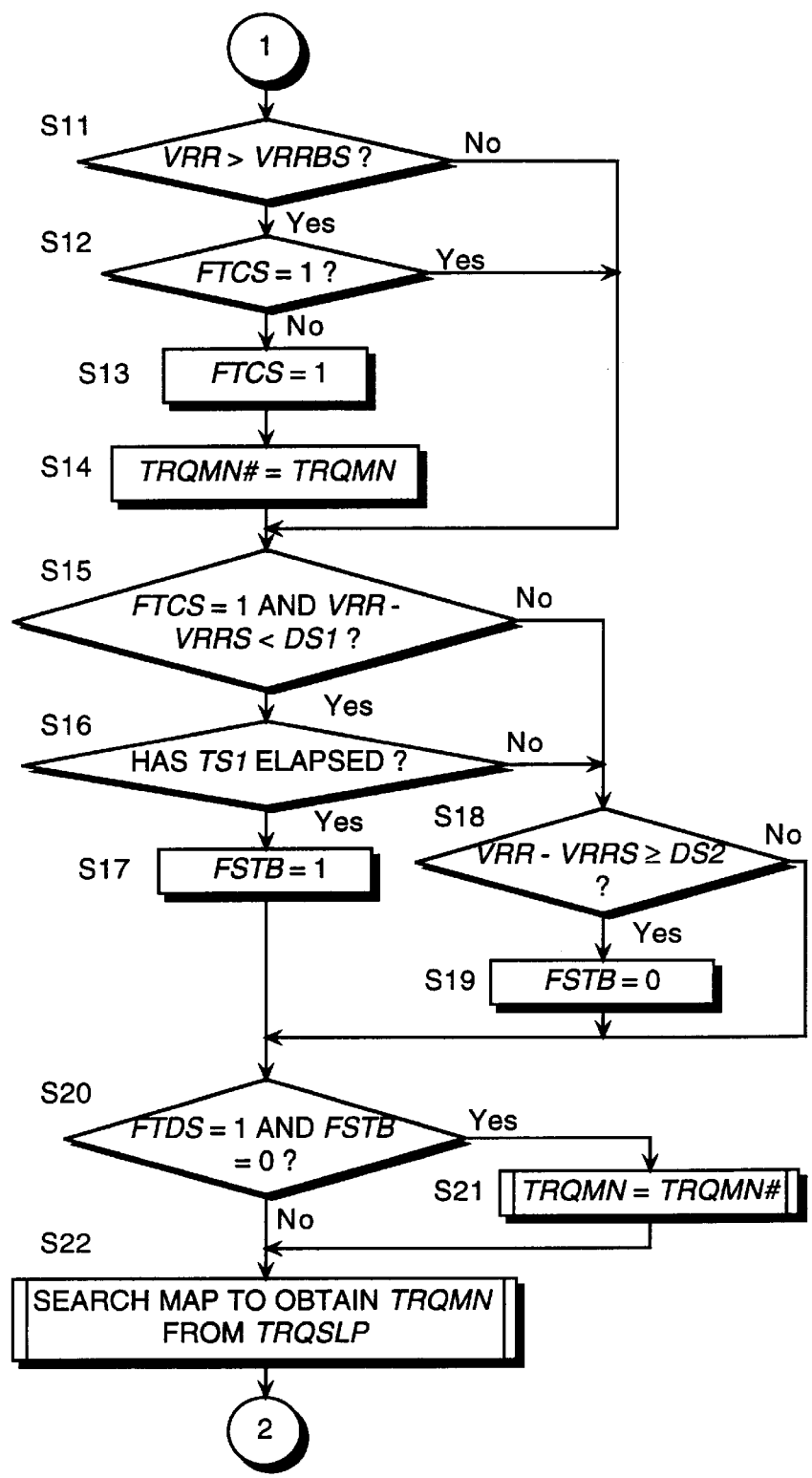

The drive torque reduction control process performed by the traction controller 1 will now be explained with reference to FIGS. 2A–2C.

This process is executed at a predetermined interval.

First, in a step S1, signals are read from the wheel speed sensors 12FR, 12FL, 12RR and 12RL, and in a step S2, the speeds VTFR, VTFL, VIRR, VTRL of the wheels are calculated.

In a step S3, the engine revolution speed Ne and gear position GEAR input from the engine controller 2 and transmission controller 3 are read, and the gear ratio iGEAR is computed from the gear position GEAR.

In a step S4, an average speed VFF of the driven wheels is calculated from the wheel speed VTFR of the right front wheel FR and the wheel speed VTFL of the left front wheel FR.

In a step S5, an average speed VRR of the drive wheels is calculated from the wheel speed VTRR of the right rear wheel RR and the wheel speed VTRL of the left rear wheel RL.

In a step S6, a predetermined value VRRBS of the drive wheel speed is calculated to detect racing of the drive wheels. This is obtained by adding a predetermined constant β to the average driven wheel speed VFF which is equivalent to the vehicle speed.

$$VRRBS = VFF + \beta$$

In a step S7, a target value VRRS of the drive wheel speed corresponding to the current vehicle speed VFF is calculated. This is obtained by adding a predetermined constant α to the average driven wheel speed VFF.

$$VRRS = VFF + \alpha$$

where,

α is set less than β

In a step S8, the front/rear acceleration Xg of the vehicle is calculated by multiplying a difference between the current value $VFF_{(n)}$ of the average driven wheel speed VFF and the value $VFF_{(n-1)}$ found in the immediately preceding process, by a predetermined conversion constant.

$$Xg = (VFF_{(n)} - VFF_{(n-1)}) \cdot K$$

In a step S9, the target drive torque TRQE required for accelerating the vehicle is computed from the following equation based on the front/rear acceleration Xg.

$$TRQE = Xg \cdot INN$$

where,

INN is an inertial mass of the vehicle and its drive system.

In a step S10, a slip factor TRQSLP (referred to hereafter as TC slip factor), which is the ratio of speeds of a turbine and impeller of the torque converter 5, is computed. When the turbine and impeller are directly connected, i.e., the rotation speed of the turbine and that of the impeller are equal, the TC slip factor.

TRQSLP is 1. On the other hand when the engine 4 is in the idling state and the vehicle is not running, the turbine rotation speed is 0, so the slip factor TRQSLP is also 0.

To compute the TC slip factor TRQSLP, a direct link drive wheel speed VENG, which is the drive wheel speed when the TC slip factor TRQSLP is 1, is found by the following expression from the gear ratio iGEAR and engine rotation speed Ne which were obtained in the step S3.

$$VENG = \frac{Ne}{iGEAR}$$

The ratio of the average drive wheel speed VRR, which is the true drive wheel speed found in the step S5, and the direct link drive wheel speed VENG, is then taken as the TC slip factor TRQSLP.

$$TRQSLP = \frac{VRR}{VENG}$$

If the torque converter 5 is provided with sensors to detect the rotation speeds of the turbine and impeller, the direct linkage TC slip factor TRQSLP may be found from the ratio of these rotation speeds detected by the sensors.

In a step S11, it is determined whether or not the average drive wheel speed VRR exceeds a predetermined value VRRBS.

When the average drive wheel speed VRR does not exceed the predetermined value VRRBS, it is considered that the drive wheels are not slipping, and the routine proceeds to a step S15.

When the average drive wheel speed VRR does exceed the predetermined value VRRBS, it is considered that the drive wheels are slipping. In this case, it is determined in a step S12 whether a racing determining flag FTCS is set to 1.

When the racing determining flag FTCS is set to 1, the routine proceeds to the step S15. When the racing determining flag FTCS is not set to 1, this flag FTCS is set to 1 in a step S13. Further, in a step S14, a target drive torque lower limit TRQMN at that time is stored as a stored value TRQMN#. The target drive torque lower limit TRQMN is calculated based on the TC slip factor TRQSLP in a step S22 described hereafter.

Due to the process of the steps S12–S14, the target drive torque lower limit TRQMN when the racing determining flag FTCS changes from 0 to 1, i.e. when racing is detected, is stored in the traction controller 1 as the stored value TRQMN#.

In a step S15, it is determined whether or not the current traction control state is the steady state. This determination is performed according to whether or not two conditions hold. Namely, when the racing determining flag FTCS is 1, and the difference between the average drive wheel speed VRR and the drive wheel speed target value VRRS is less than a predetermined threshold value DS1, it is determined that the state is the steady state.

When the aforesaid two conditions hold, the routine proceeds to a step S16.

When either of the two conditions is not satisfied, the routine proceeds to a step S18.

In the step S16, it is determined whether or not the steady state determined in the step S15 continues for a predetermined time TS. When the steady state continues for a predetermined time TS1, the routine proceeds to a step S17, and a steady state determination flag FSTB is reset to 1.

Figure 3A:
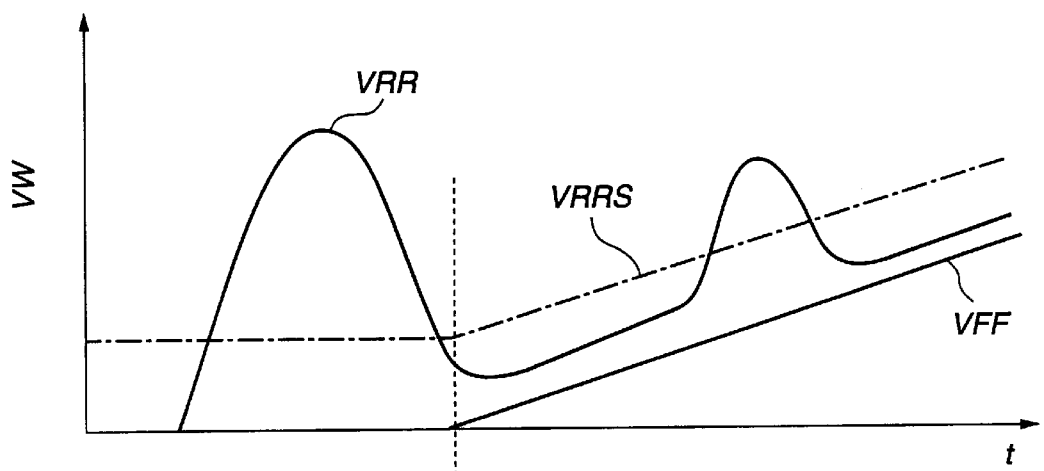
FIGS. 3A and 3B are graphs showing an average drive wheel speed VRR, drive wheel target speed VRRS, and the difference therebetween, according to this invention.
Figure 3B:
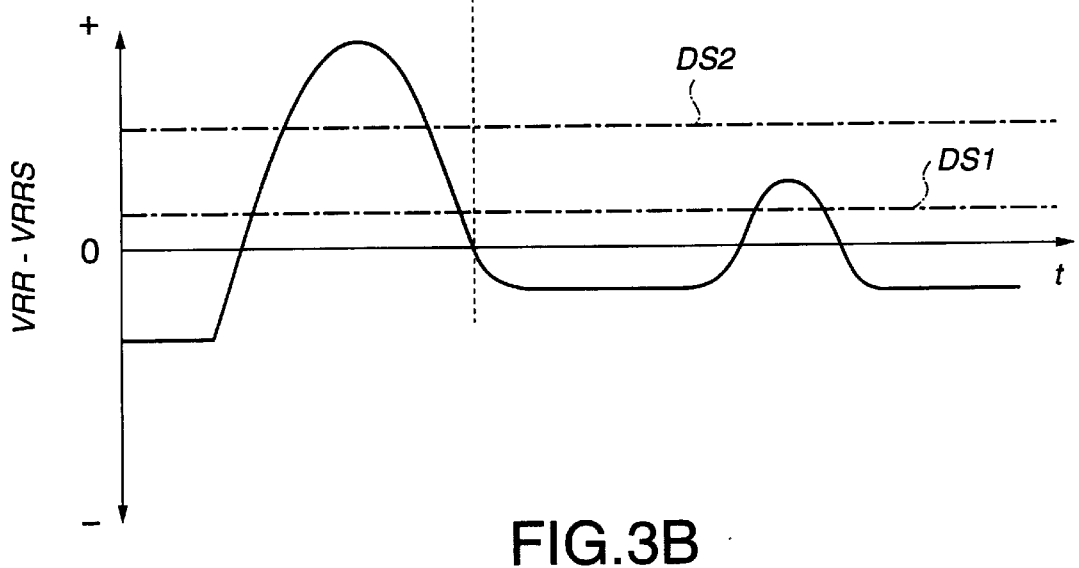

When it is determined that the predetermined time TS1 determined in the step S16 has not elapsed, the routine proceeds to the step S18, and it is determined whether or not the difference between the average drive wheel speed VRR and the target speed VRRS is equal to or greater than a threshold value DS2 shown in FIG. 3B. When the difference is equal to or greater than the threshold value DS2, it is determined that the traction control state is no longer the steady state, the routine proceeds to a step S19, and the steady state determining flag FSTB is reset to 0. The threshold value DS1 is less than the threshold value DS2, and is set to a value near 0.

Summarizing the process of the aforesaid steps S15–S19, the steady state determining flag FSTB is set or reset according to the following conditions. When FTCS=1 and VRR−VRRS<DS1 for TS1 milliseconds or longer, the steady state determining flag FSTB is set to 1. The time referred to herein is the time for which traction control is performed and for which the drive wheel speed is near the target value, i.e. the time for which steady state traction control is performed.

On the other hand, when FTCS=0 or VRR−VRRS≧DS2, the steady state determining flag FSTB is reset to 0.

When none of the above conditions holds, the steady state determining flag FSTB is not changed, and is held at the value to which it was set in the preceding process.

In a step S20, a division of conditions is performed based on the state of the racing determining flag FTCS and the steady state determining flag FSTB set in the aforesaid process.

When the racing determining flag FTCS=1 and steady state determining flag=0, the routine proceeds to a step S21, and the target drive torque lower limit TRQMN is set equal to a stored value TRQNM#.

In all other cases, the routine proceeds to a step S22, and the drive torque lower limit TRQMN is computed based on the TC slip factor TRQSLP calculated in the step S12. This is done by searching the contents of a map shown in FIG. 4 which has previously been stored in the traction controller 1. Alternatively, a function having the same contents may previously be set in the traction controller 1 and the target drive torque lower limit TRQMN found using this function.

The lower limit TRQMN gradually decreases to a predetermined value as the TC slip factor.

Figure 4:
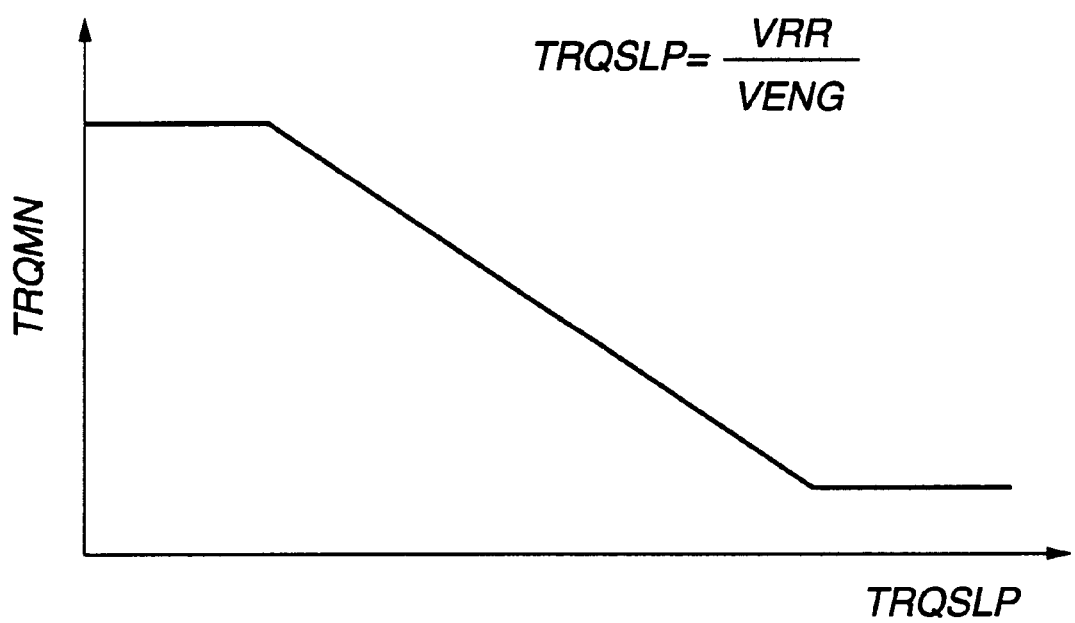
FIG. 4 is a graph describing the contents of a map of a target drive torque lower limit TRQMN stored in the traction controller.
Figure 5:
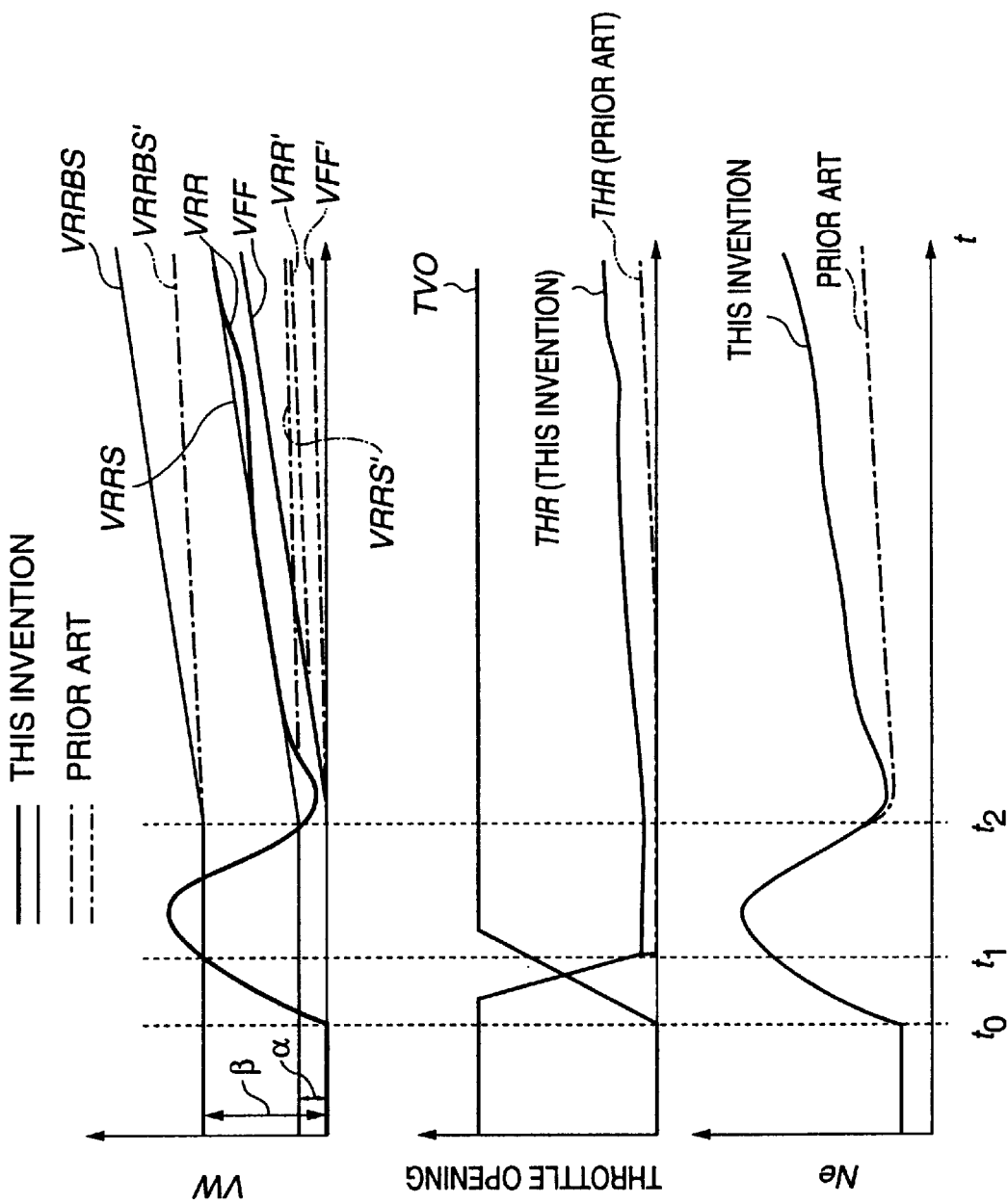
FIGS. 5A–5C are timing charts comparing the control results obtained by the drive torque control device in comparison with those obtained by a conventional device.

TRQSLP increases, i.e. as the turbine rotation speed on the output side of the torque converter increases, as shown in FIG. 4. On the other hand, under high load when the impeller rotation speed on the input side is high, the lower limit TRQMN takes a larger value.

The target drive torque lower limit TRQMN stored as the store value TRQMN# in the step S14 is the value calculated in the preceding or earlier process in the step S22. Provided that the condition of the step S20 holds, the calculation of the step S22 is not performed. Also, provided that the calculation of the step S22 is not performed, the target drive torque lower limit TRQMN is always equal to the stored value TRQMN#.

Figure 2C:
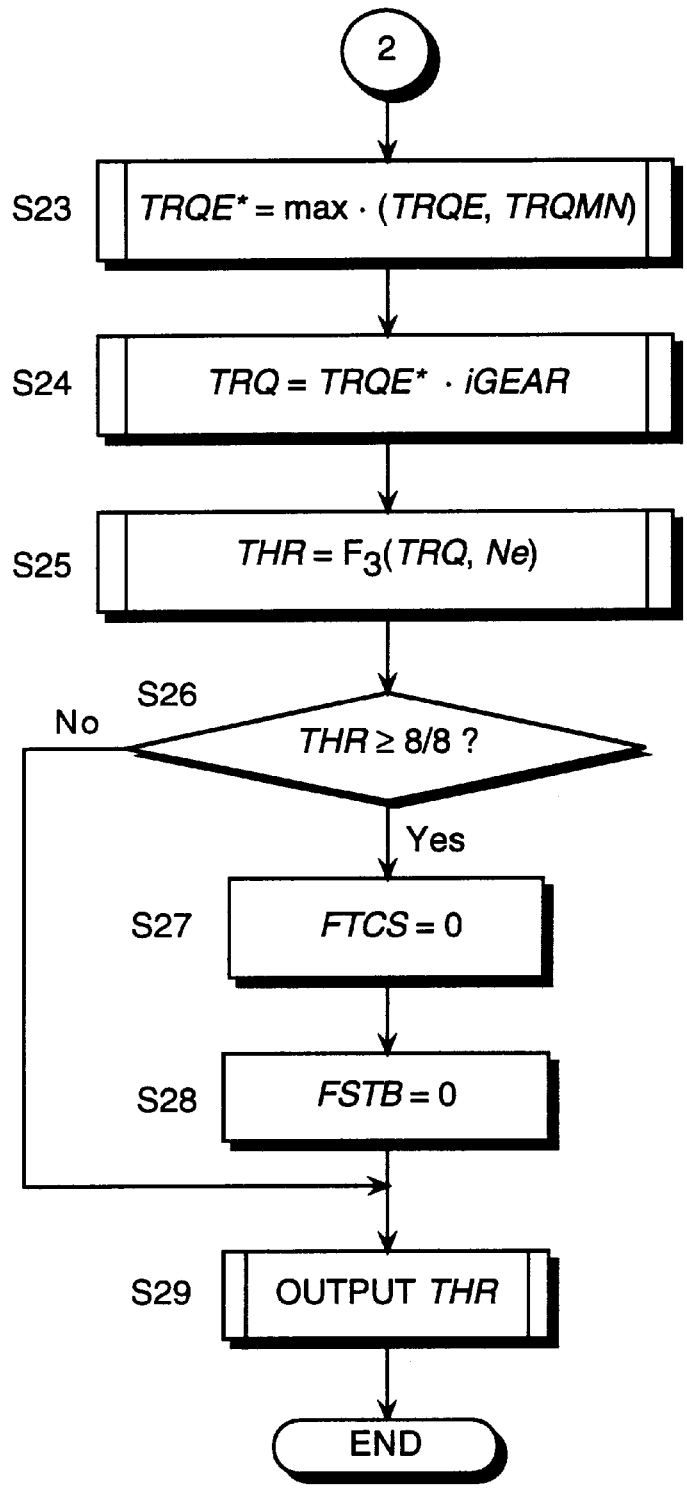

As a restriction is applied to the target drive torque lower limit in a step S23 shown in FIG. 2C, the larger of the target drive torque lower limit TRQMN found in the step S22 and the target drive torque TRQE found in the step S11 is set as an apparent target drive torque value TRQE*.

In a step S24, a target engine torque TRQ is calculated by the following expression from the apparent target drive torque TRQE* and the gear ratio iGEAR of the automatic transmission 6.

$$TRQ = TRQE* \cdot iGEAR$$

Figure 11:
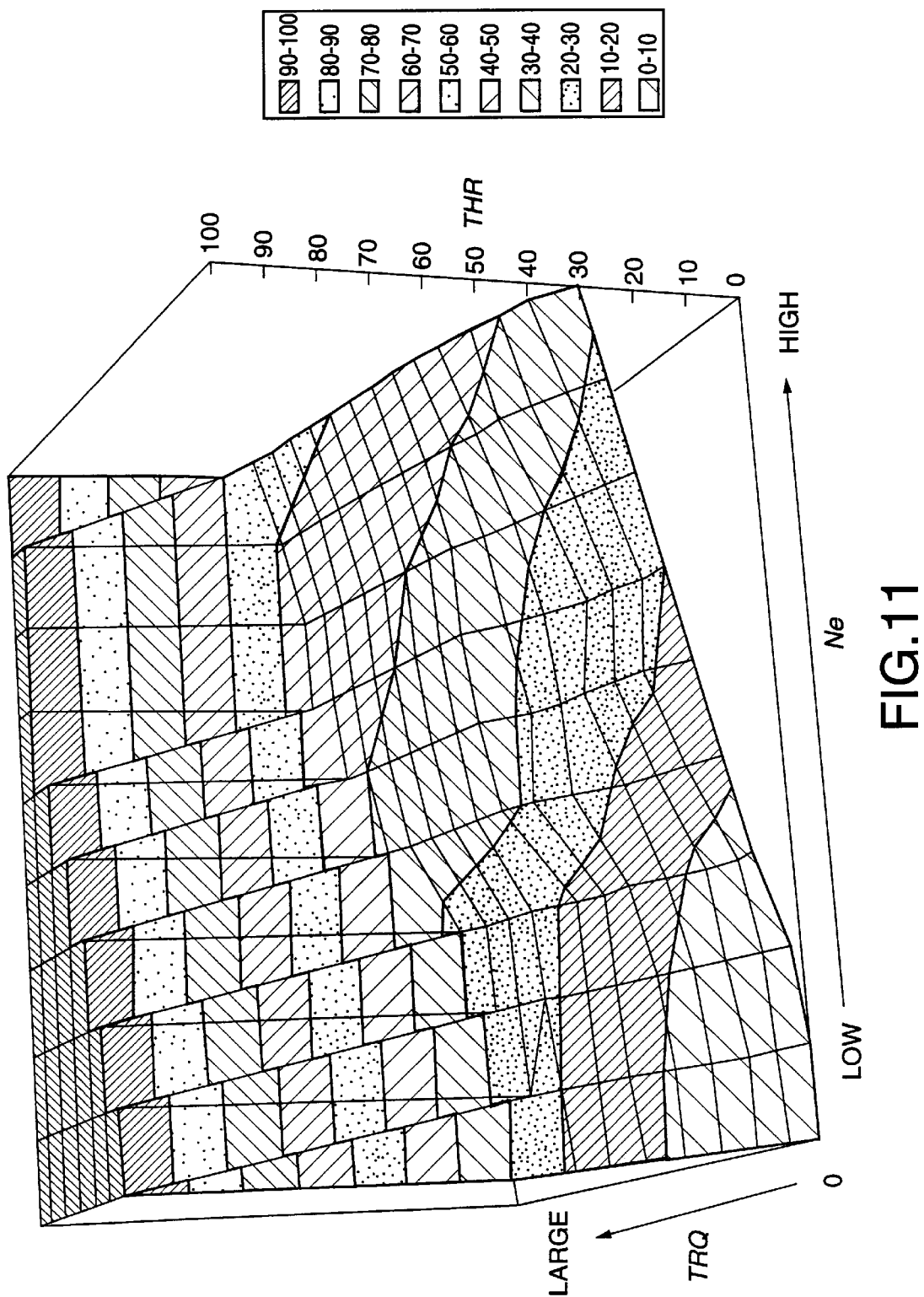
FIG. 11 is a three-dimensional graph showing the contents of a map of an opening THR of a second throttle stored by the traction controller in the third embodiment.

In a step S25, a map shown in FIG. 11 stored in the traction controller 1 is searched from the target engine torque TRQ and engine rotation speed Ne so as to find an opening THR of the second throttle 10. This map is determined beforehand by experiment.

In a step S26, it is determined whether or not the opening THR of the second throttle 10 found in the step S25 is full (8/8).

Herein, the result that the throttle is required to be at least fully open means that drive torque reduction control is not required. In this case therefore, the racing determining flag FTCS and steady state determining flag FSTB are both reset to in 0 in steps S27, S28.

In the step S26, termination of traction control may also be determined by determining whether the opening THR of the second throttle 10 is equal to or greater than the opening TVO of the first throttle 8.

When THR is fully open, this THR is then output to the actuator 9 in a step S29 and the routine terminates.

When on the other hand it is determined that the second throttle opening THR is not fully open in the step S26, the routine proceeds directly to a step S29 where the second throttle opening THR is output to the actuator 9. In this case, the second throttle 10 is controlled to an opening equivalent to THR, and drive torque is reduced.

By performing this process at a predetermined interval, vehicle acceleration is assured while reducing racing of the drive wheels when the vehicle is starting or accelerating.

Next, a description will be given of how the state of motion of the vehicle changes in the above-mentioned control process with reference to FIGS. 5A–7B.

These figures show starting and acceleration on a rising slope having a high frictional coefficient $\mu$.

When the driver starts to depress the accelerator pedal 7 to the maximum degree at a time $t_0$, the first throttle opening TVO increases as shown in FIG. 5B, the engine rotation speed Ne also increases as shown in FIG. 5C, and the average drive wheel speed VRR rises as shown in FIG. 5A.

Before the vehicle starts, the average driven wheel speed VFF is 0, and the target drive torque TRQE is also 0. Therefore before the vehicle starts, the apparent target drive torque TRQE* calculated in the step S23 is equal to the target drive torque lower limit TRQMN. The target drive torque lower limit TRQMN decreases as shown in FIG. 7A with increase of the TC slip factor.

Figure 6:
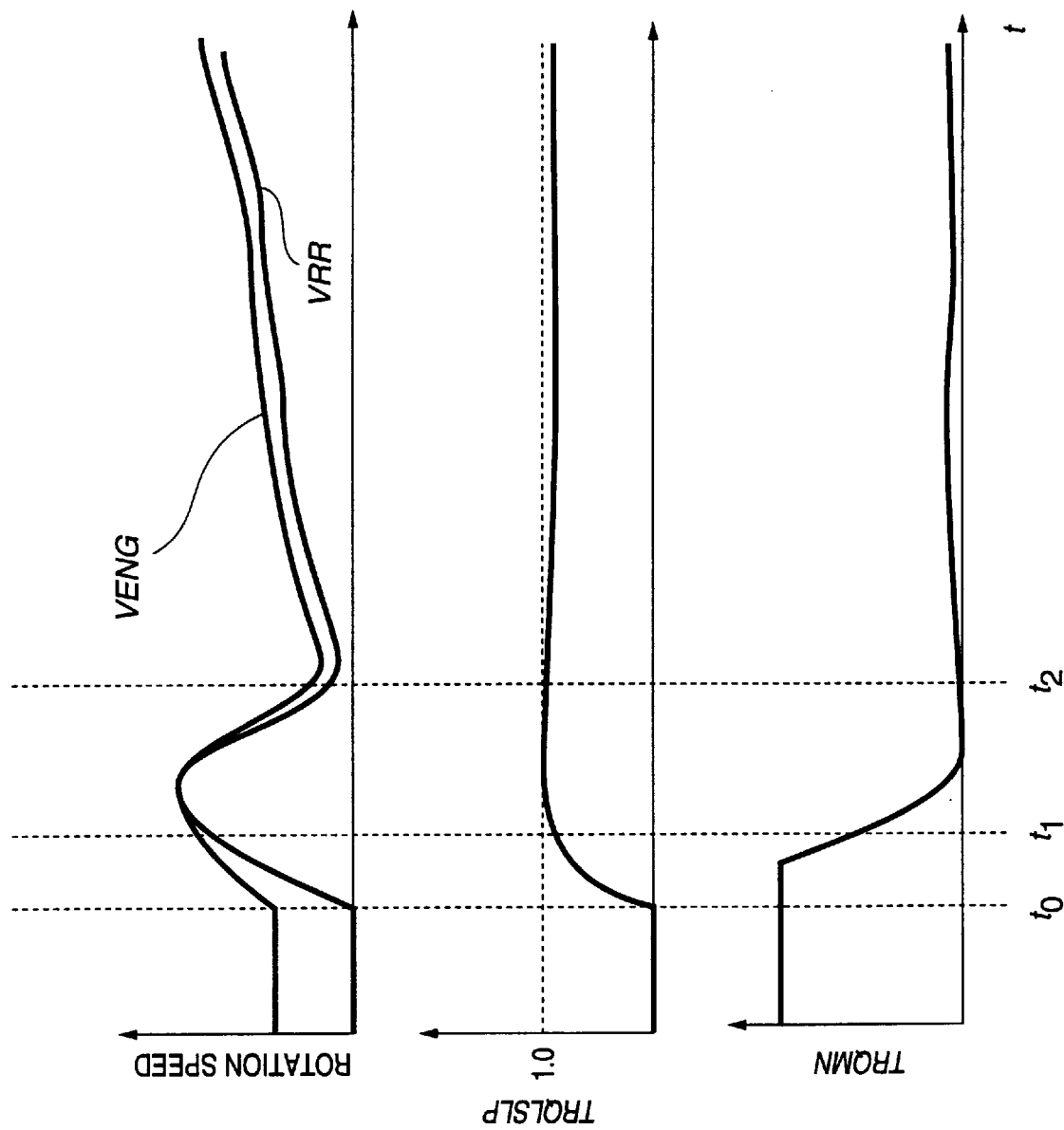
FIGS. 6A–6C are timing charts showing variations of a direct link drive wheel speed VENG, the average drive wheel speed VRR, slip factor TRQSLP of a torque converter, and the target drive torque lower limit TRQMN, according to this invention.
Figure 7:
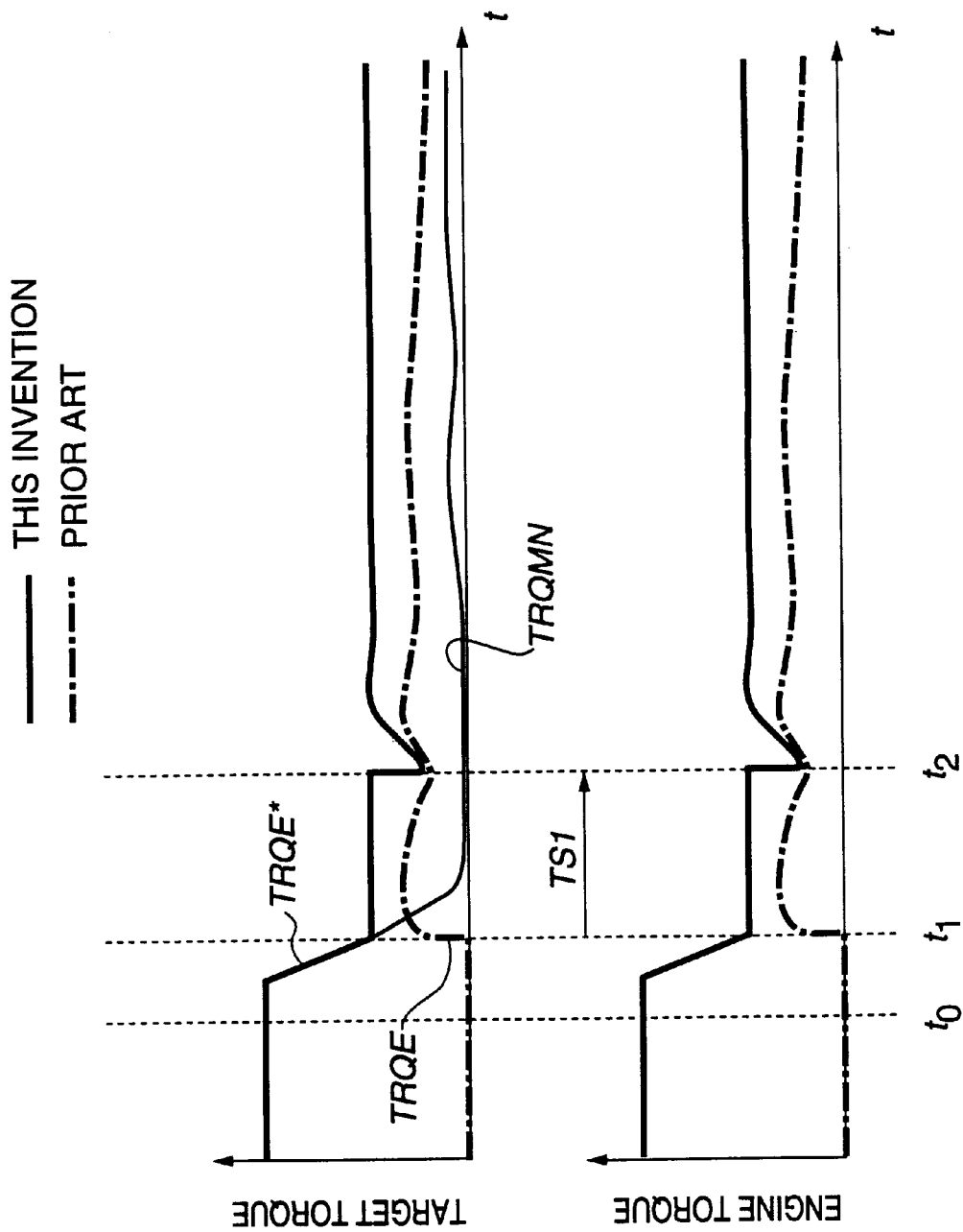
FIGS. 7A–7B are timing charts comparing variations of a target drive torque TRQE and an engine torque TRQ under drive torque reduction control by the drive torque control device in comparison with the control of the conventional device.

TRQSLP shown in FIG. 6 B. The second throttle opening THR therefore decreases, and engine output falls as shown in FIG. 7B.

When the average drive wheel speed VRR exceeds a predetermined value VRRBS at a time $t_1$, the racing determining flag FTCS is set to 1 in the step S13. Herein, if VRRBS−BRRS=β−α≧DS2, the steady state determining flag FSTB is already 0 when the average drive wheel speed VRR exceeds the predetermined value VRRBS, and subsequently provided that FTCS=1, the target drive torque lower limit TRQMN is fixed at the lower limit TRQMN# for the predetermined time TS1 up to a time $t_2$. This lower limit TRQMN# is the target drive torque lower limit TRQMN when the racing determining flag FTCS changes from 0 to 1.

The target drive torque lower limit TRQMN is set according to the TC slip factor TRQSLP as shown in FIG. 4.

As clearly seen from this figure, the smaller the TC slip factor TRQSLP becomes, i.e. the larger the ratio of the impeller rotation speed on the input side and the turbine rotation speed on the output side of the torque converter 5, the larger the value of the target drive torque lower limit TRQMN.

Herein, the nearer the TC slip factor TRQSLP is to 0, the higher the load, i.e. the higher the resistance to vehicle motion.

Conversely, the nearer the TC slip rate TRQSLP is to 1, the smaller the load, i.e. the lower the resistance to vehicle motion.

In the aforesaid prior art example, the target drive torque lower limit TRQMN is not fixed to the lower limit TRQMN#, hence the target drive torque lower limit TRQMN further decreases as shown in FIG. 7A according to increase of the TC slip factor TRQSLP. As a result, the second throttle opening THR becomes almost fully closed as shown by the single dotted line in FIG. 5B, and the torque on starting is largely reduced.

Therefore although racing of the drive wheels is suppressed, the drive wheel speed VRR' and driven wheel speed VFF' in the prior art hardly increases at all after the time $t_2$ as shown in FIG. 5C, smooth acceleration cannot be performed, and the driver experiences an uncomfortable feeling.

According to this invention on the other hand, the magnitude of the TC slip factor TRQSLP is considered as the magnitude of the resistance to vehicle motion, and as shown in FIG. 4, the lower limit TRQMN of the drive torque is varied according to the TC slip factor TRQSLP. Consequently, when resistance to vehicle motion is high such as on a rising slope or a road surface having a high frictional coefficient $\mu$, the second throttle opening THR is a larger value than in the prior art as shown in FIG. 5B. As a result, the speed VFF of the driven wheels increases smoothly against the resistance to vehicle motion, while racing of the drive wheels is prevented. The vehicle equipped with this drive torque control device therefore has improved drivability and acceleration performance.

Figure 8:
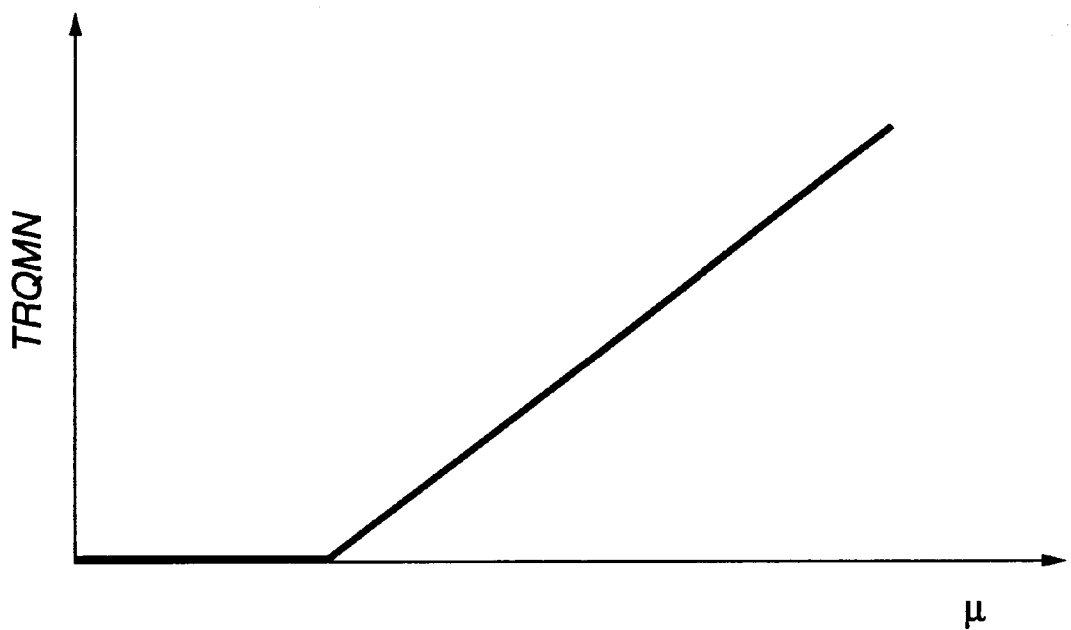
FIG. 8 is a graph describing the contents of a map of the target drive torque lower limit TRQMN according to a second embodiment of this invention.
Figure 9A:
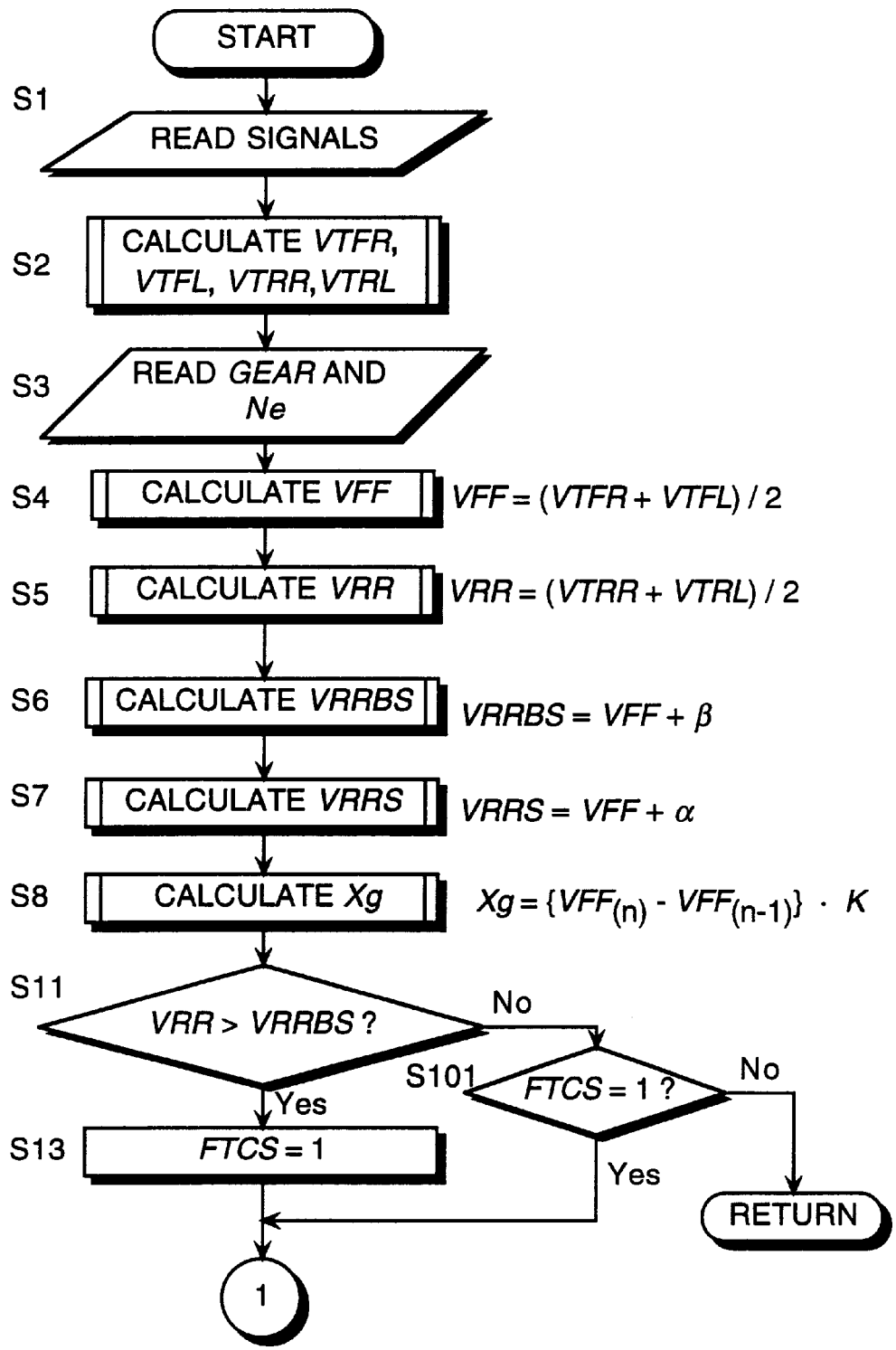
FIGS. 9A–9D are flowcharts describing a drive torque reduction control process according to a third embodiment of this invention.
Figure 9B:
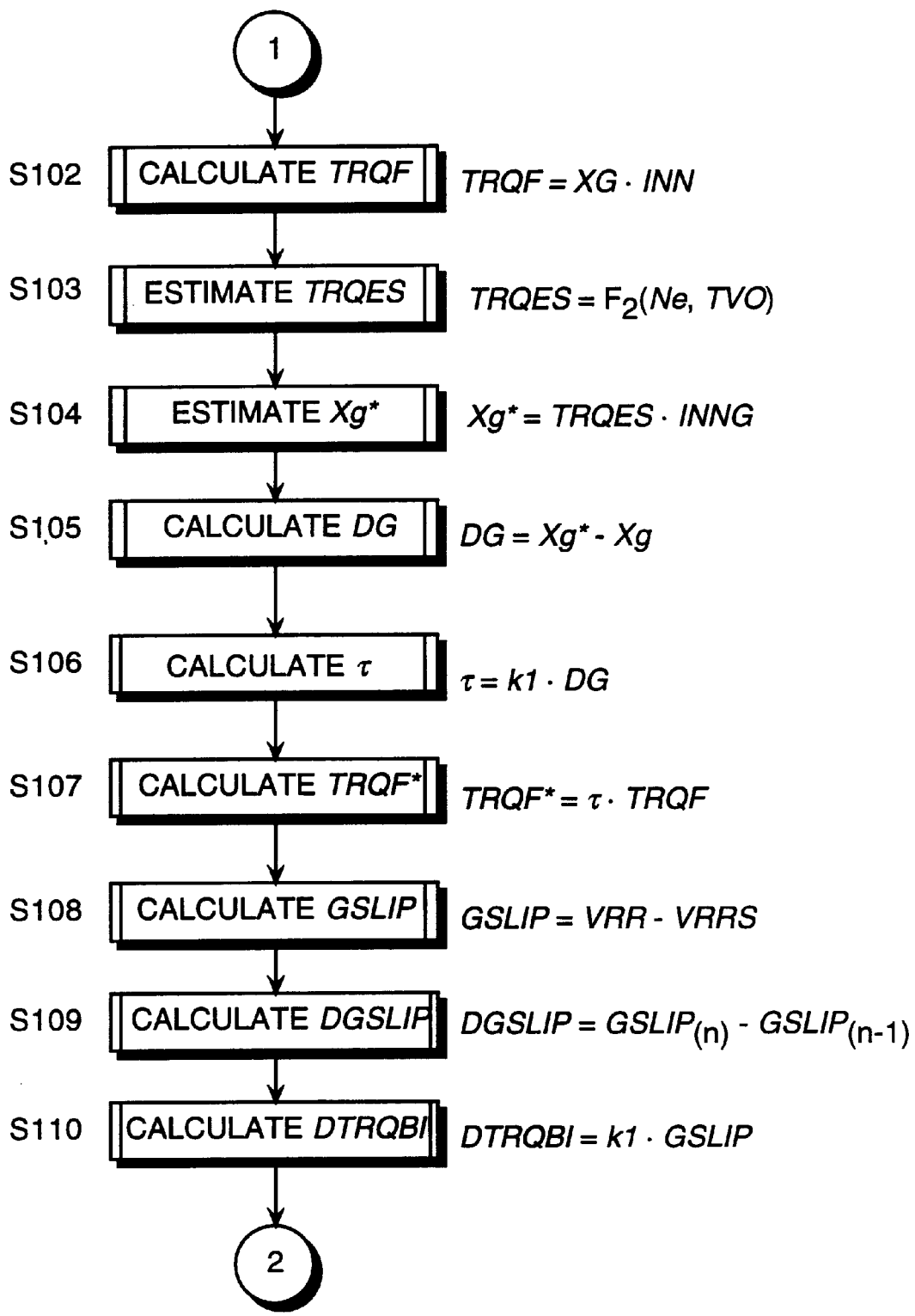
Figure 9C:
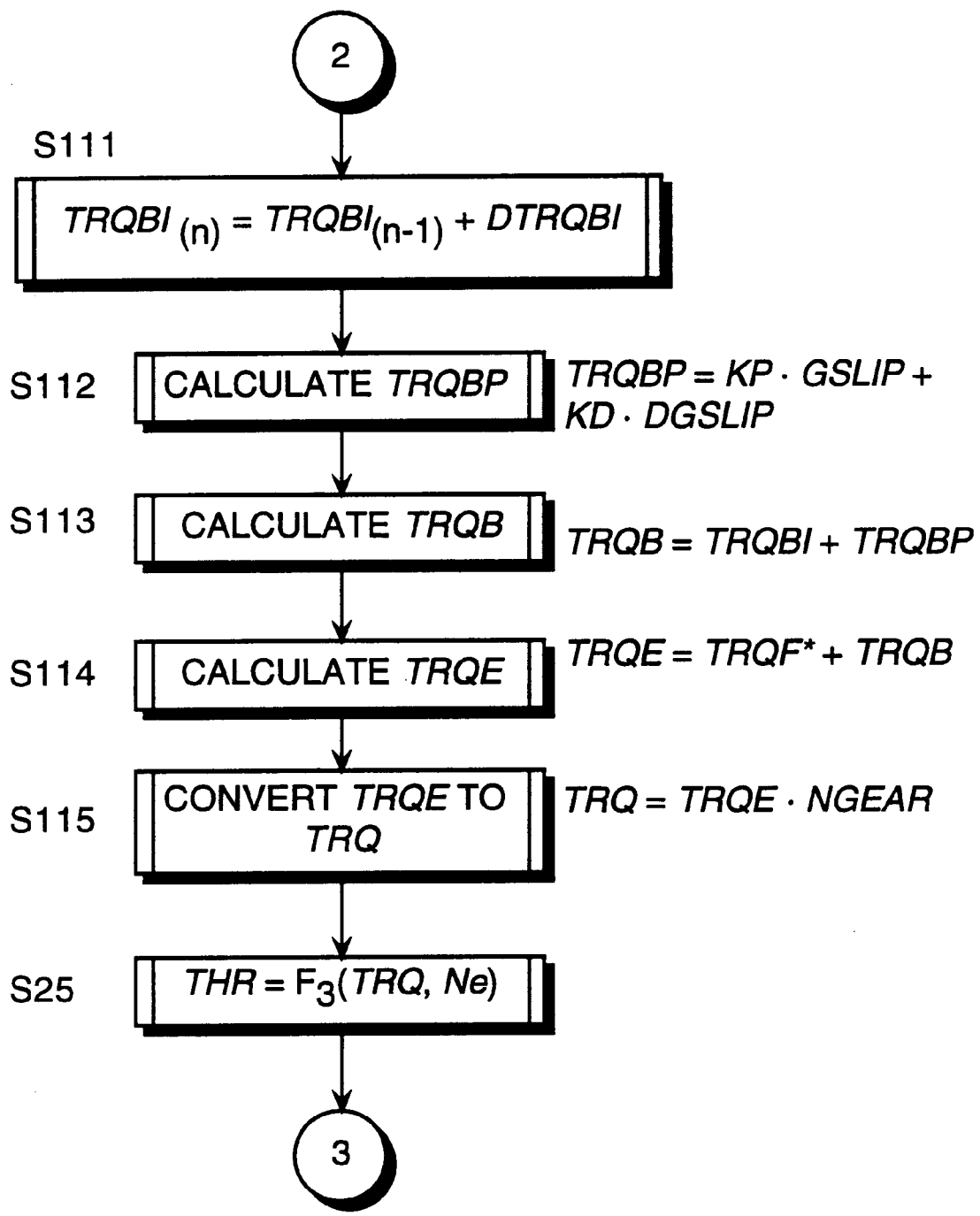
Figure 9D:
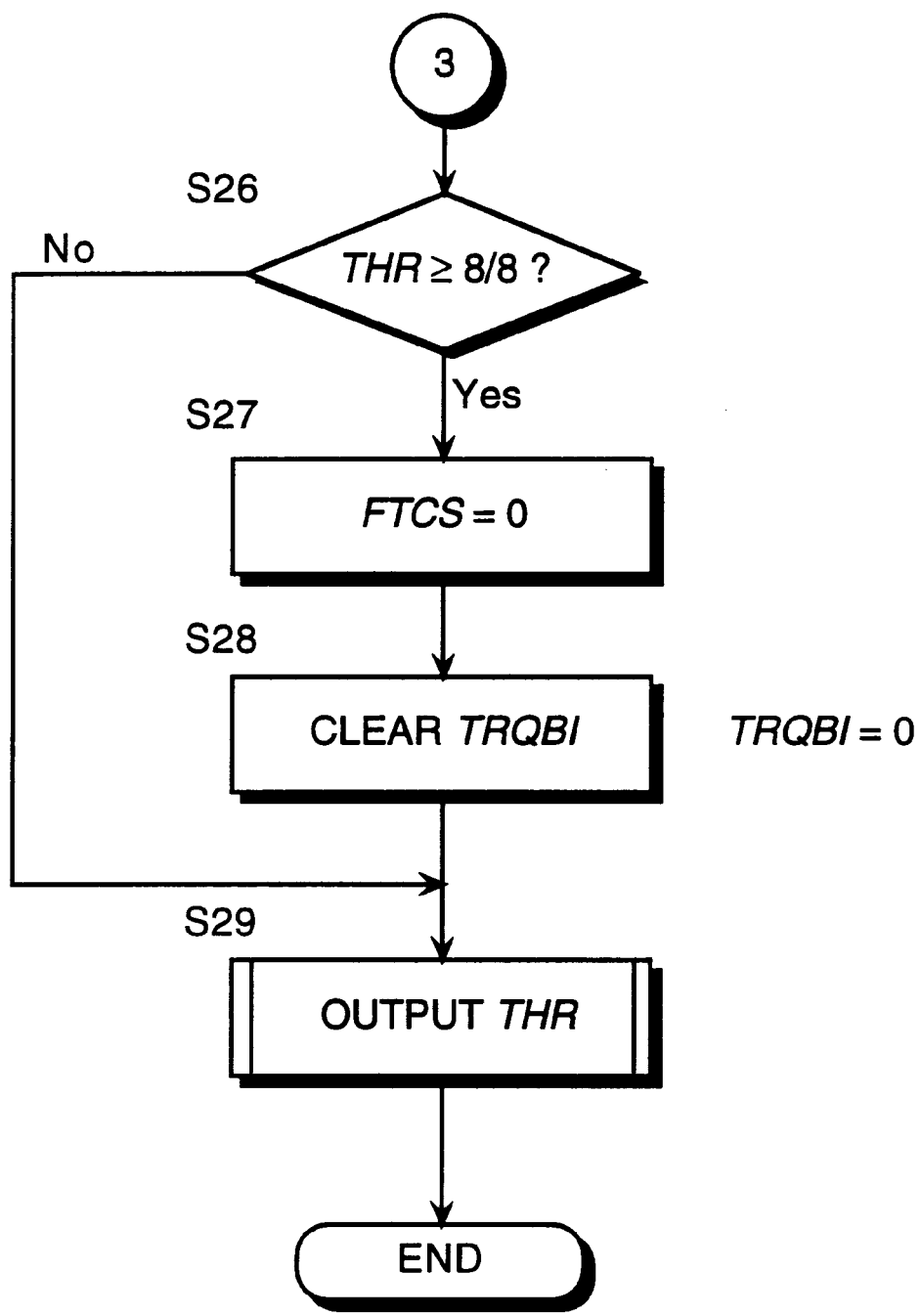

FIG. 8 shows a second embodiment of this invention.

In the above first embodiment, the TC slip factor TRQSLP was considered as a value representative of the resistance to vehicle motion, however according to the second embodiment, the TC slip factor TRQSLP is regarded as a value representative of the frictional coefficient $\mu$. In this case, the relation between the target drive torque lower limit TRQMN, the frictional coefficient of the road surface $\mu$ and the resistance to vehicle motion is expressed by the following table:

| TRQMN | TRQSLP | Resistance to vehicle motion | $\mu$ of road surface |
|---|---|---|---|
| LARGE | SMALL | LARGE | LARGE |
| SMALL | LARGE | SMALL | SMALL |

In this way, the frictional coefficient $\mu$ of the road surface is precisely detected based on the TC slip factor TRQSLP. A map as shown in FIG. 8 or function specifying the relation between the frictional coefficient $\mu$ and target drive torque lower limit TRQMN is previously stored in the traction controller 1 in this second embodiment, and the target drive torque lower limit TRQMN is varied according to the frictional coefficient $\mu$. According also to this second embodiment, racing of the drive wheels is prevented and reliable acceleration is assured as in the first embodiment mentioned above.

In addition to the second throttle, various means may be used to reduce the drive torque, for example engine control such as fuel cut or ignition timing retardation, or braking of the drive wheels RR, RL.

Next, a third embodiment of this invention will be described with reference to FIGS. 9A–9D.

The construction of the hardware according to this embodiment is the same as that of the aforesaid first embodiment, and is different from the first embodiment insofar as concerns the drive torque control process executed by the traction controller 1. Specifically, the target drive torque is set to obtain a vehicle acceleration according to the engine output instead of setting a lower limit of the target drive torque.

In the drive torque control process shown in FIGS. 9A–9D, the steps S1–S8 are the same as in the first embodiment. However, determination of racing of the drive wheels is immediately performed in the step S11 following the step S8. When the drive wheels are racing, the racing determining flag FTCS is set to 1 in the step S13.

When the drive wheels are not racing, in a step S101, it is determined whether or not the racing determining flag FTCS is set to 1. When the racing determining flag FTCS is not set to 1, the routine is terminated.

When it is determined that the drive wheels are racing in the step S11, or the racing determining flag FTCS is 1 in the step S101, a target drive torque TRQF is calculated in a step S102 based on the front/rear acceleration Xg. The method of this calculation is the same as that of the step S9 of the first embodiment. According to the first embodiment, the torque obtained by this calculation is the target drive torque TRQE, however according to this embodiment, it is referred to as TRQF for reasons of simplicity of description.

Figure 10:
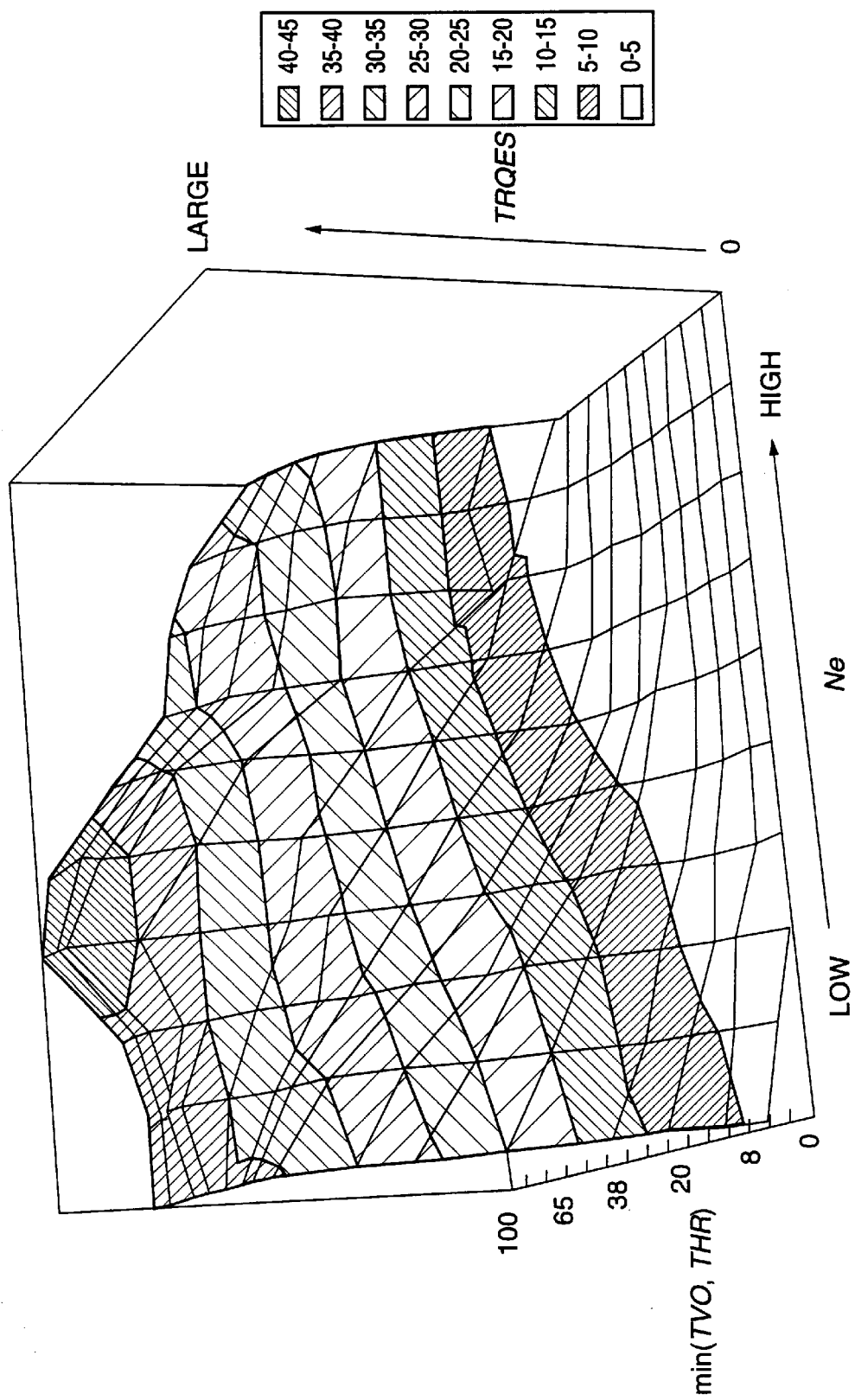
FIG. 10 is a three-dimensional graph showing the contents of a map of a true engine torque TRQES stored by a traction controller according to the third embodiment of this invention.

Next in a step S103, the true engine torque TRQES is estimated. For this purpose, an experimentally determined map of the true engine torque TRQES shown in FIG. 10, which is based on the first throttle opening TVO and the second throttle opening THR, and on the engine rotation speed Ne, is previously stored in the traction controller 1. In the step S103, this map is searched to estimate the true engine torque TRQES.

In a step S104, an estimated acceleration Xg* which should be obtained on a flat road is found from the true engine torque TRQES using the following expression.

$$Xg^* = TRQES \cdot INNG$$

where,
INNG=torque specific to the vehicle required for unit acceleration.

In a step S105, a difference DG between the true acceleration Xg obtained in the step S8 and estimated acceleration Xg* is computed.

$$DG = Xg^* - Xg$$

In a step S106, a correction coefficient τ is calculated by multiplying this difference DG by a predetermined coefficient K1.

$$\tau = K1 \cdot DG$$

In a step S107, a feedforward (open loop) term (referred to hereafter as F/F term) TRQE* of the target drive torque is found by multiplying the target drive torque TRQF by the correction coefficient τ.

According to this embodiment, the target drive torque TRQE comprises the feedforward term (referred to hereafter as F/F term) TRQE* and a feedback term (referred to hereafter as F/B term) TRQB. The F/F term is determined based on the true acceleration as described above, and the F/B term is determined based on the drive wheel speed. The F/B term depends on differential/integral/proportional control (DIP control) known in the art, and comprises a proportional/differential term and an integral term.

The F/B term is calculated in the steps S108–S113.

First, in a step S108, a drive wheel slip deviation GSLIP is found from the average drive wheel speed VRR and drive wheel target speed VRRS.

In a step S109, a differential DGSLIP of the slip deviation GSLIP, is calculated from the present value $GSLIP_{(n)}$ and the immediately preceding value $GSLIP_{(n-1)}$ using the following equations.

$$GSLIP = VRR - VRRS$$

$$DGSLIP = GSLIP_{(n)} - GSLIP_{(n-1)}$$

In a step S110, a variation amount DTRQBI of the integral term of the F/B term is found by multiplying the slip deviation GSLIP by a predetermined integral gain K1.

$$DTRQBI = K1 \cdot GSLIP$$

In a step S111, an integral term TRQBI in the F/B term is calculated based on DTRQBI using the following equation.

$$TRQBI_{(n)} = TRQBI_{(n-1)} + DTRQBI$$

where,
$TRQBI_{(n)}$=current value of TRQBI
$TRQBI_{(n-1)}$=immediately preceding value of TRQBI.

In a step S112, the proportional/differential term TRQBP in the F/B term is computed by the following equation.

$$TRQBP = KP \cdot GSLIP + KD \cdot DGSLIP$$

where,
KP=predetermined proportional gain
KD=predetermined differential gain.

In a step S113, the F/B term is determined by the following equation.

$$TRQB = TRQBI + TRQBP$$

In a step S114, the target drive torque TRQE is computed from the F/F term TRQF* and the F/B term TRQB.

$$TRQE = TRQF + TRQB$$

In a step S115, the target drive torque TRQE is converted to the engine output torque TRQ by the next equation. NGEAR is a conversion constant set according to the dimensions of the vehicle.

$$TRQ = TRQE \cdot NGEAR$$

In a step S25, the opening THR of the second throttle 10 for achieving the engine torque TRQ is found in the same way as in the aforesaid first embodiment.

The steps S26, S27 and S29 are the same as in the first embodiment. However when THR is 8/8 in the step S26, the integral term TRQBI in the F/B term is cleared to 0 in a step S116 after the processing of the step S27.

According to the above control process, the target drive torque TRQE is found by adding the F/B term TRQB of the target drive torque found based on the slip deviation GSLIP, and the F/F term TRQF* of the target drive torque corrected by the true engine torque TRQES and the correction coefficient τ according to the acceleration Xg. According also to the aforesaid prior art example, the target engine torque TRQE is found by adding the F/B term to the F/F term, however no correction is applied to the F/F term depending on the true engine torque TRQES and acceleration Xg.

Figures 12A, 12B, 12C:
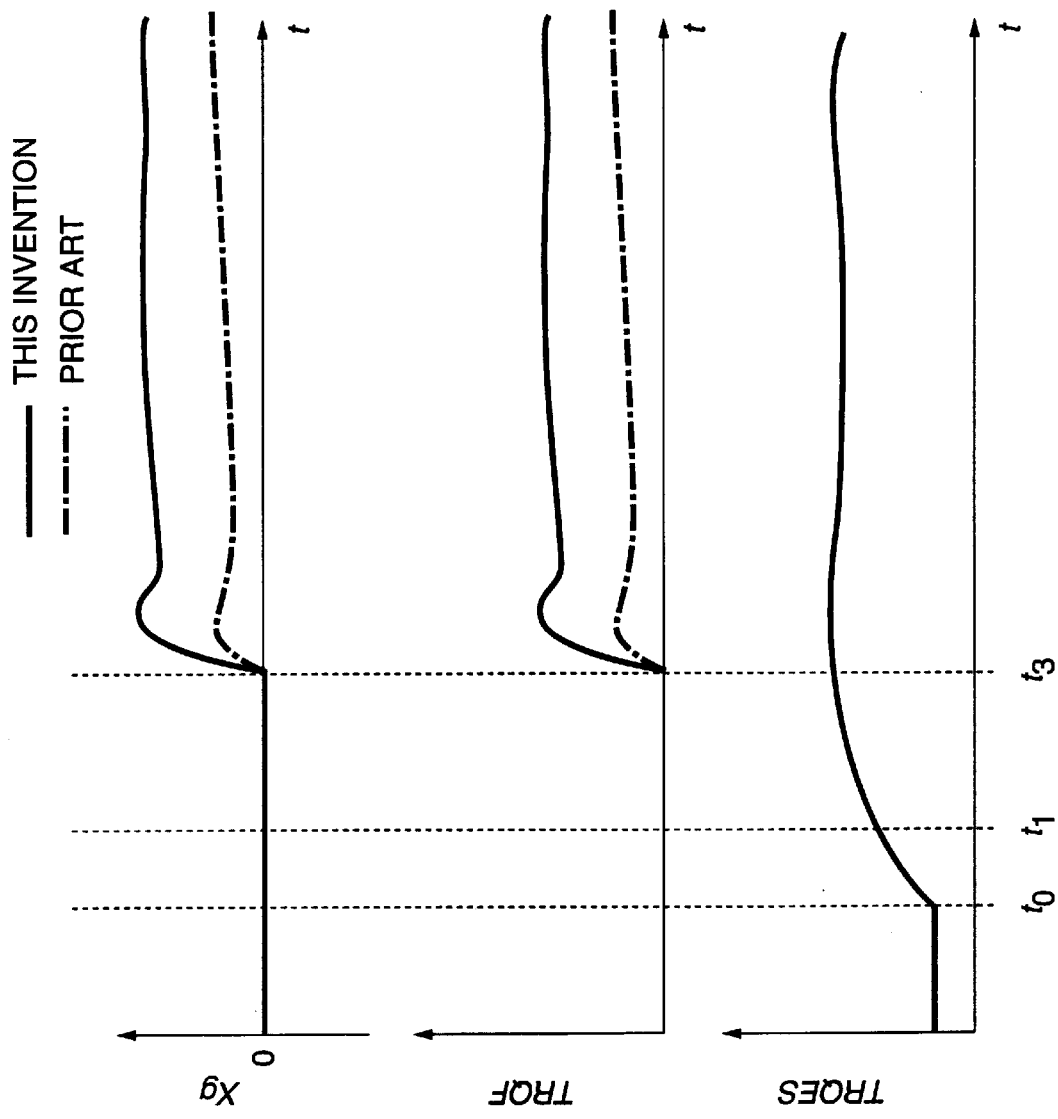
FIGS. 12A–12N are timing charts showing control results obtained by the drive torque control device according to the third embodiment.
Figures 12I, 12J:
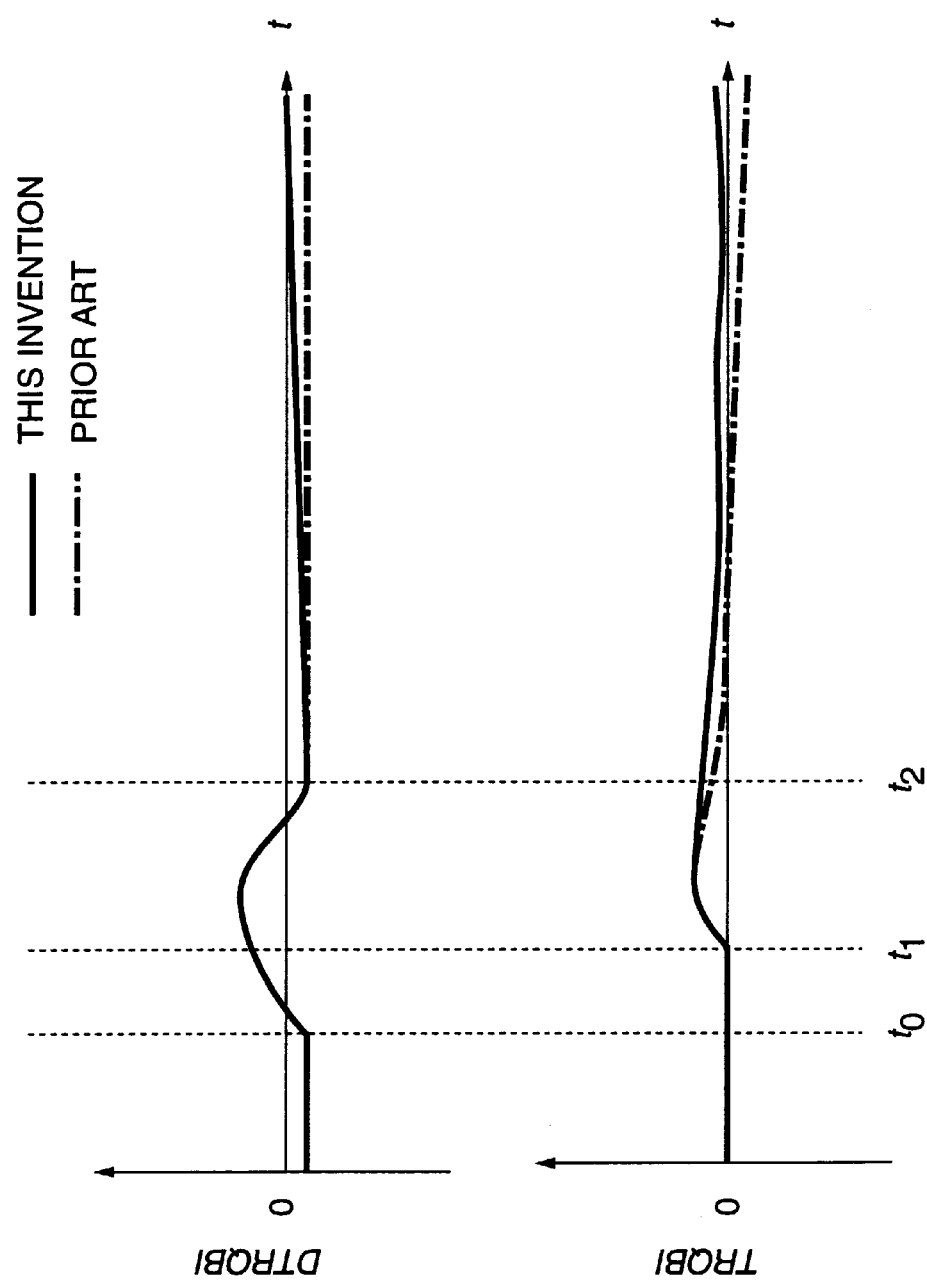
Figures 12M, 12N:
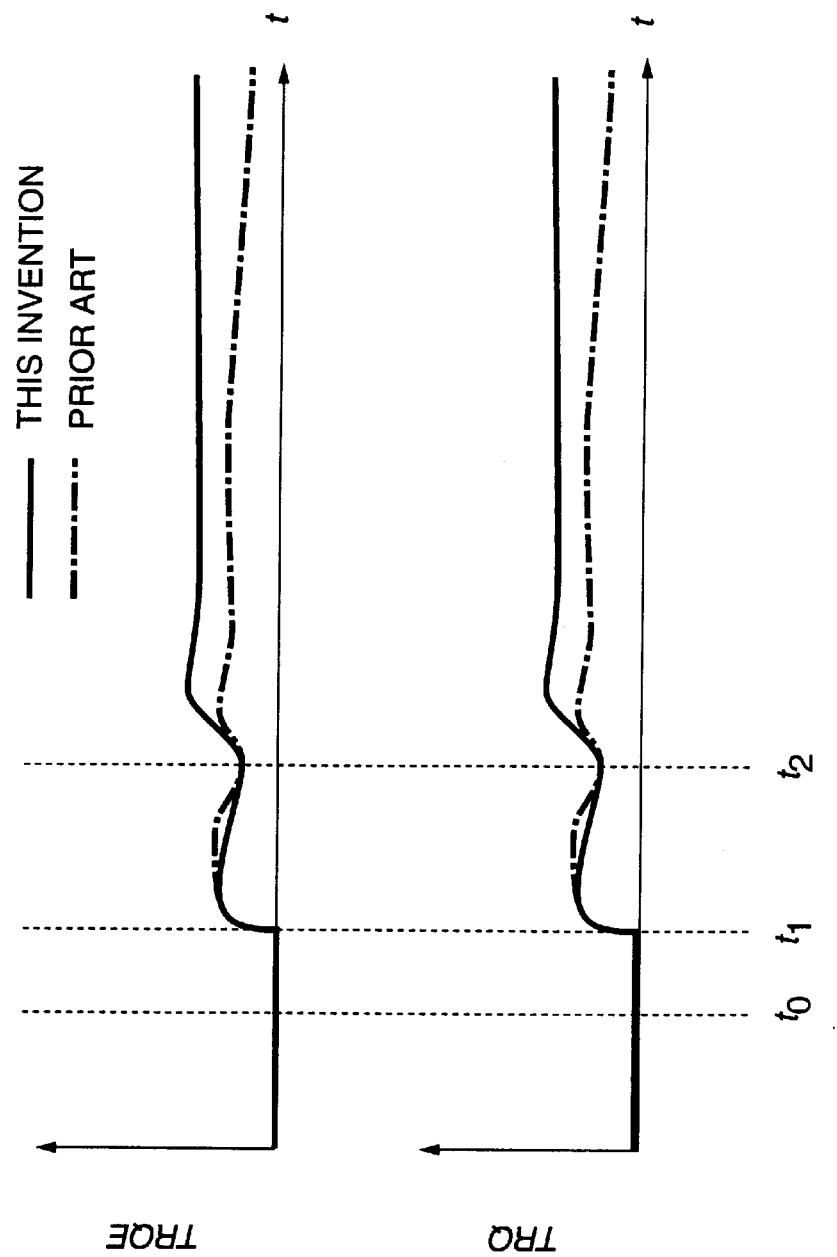

Therefore according to the prior art example, as shown by the single dotted line of FIGS. 12A and 12B, the F/F term of the target drive torque does not increase even after the time $t_2$ when racing of the drive wheels is suppressed, and the second throttle 10 remains effectively closed.

Consequently even when the driver depresses the accelerator pedal, the vehicle speed remains low. It might be thought that this problem could be corrected by increasing the gain of the F/B term, however in this case hunting of the drive torque easily occurs on a road having a low μ, and drivability of the vehicle is impaired.

On the other hand, according to this third embodiment, the F/F term is corrected by the correction coefficient τ, so the F/F term after correction rapidly increases and the second throttle 10 is opened as shown by the solid line in FIG. 12B after the time $t_2$ when the suppression of racing of the drive wheels is completed.

Therefore after racing of the drive wheels is suppressed, an acceleration desired by the driver is rapidly obtained. Also the gain of the F/B term need not be set large, so good drivability is obtained even on a road of low μ. In this case, the calculated values shown in the flowcharts vary as shown in FIGS. 12C–12N.

Hence, according to the third embodiment, the same acceleration characteristics are obtained as according to the first embodiment.

According to the above third embodiment, only the F/F term was corrected by the correction coefficient τ, however the F/B term TRQB may also be corrected by the correction coefficient τ, or the target drive torque TRQE which is the sum of the F/F term and F/B term may be corrected by the correction coefficient τ.

The embodiments of this invention in which an exclusive property or privilege is claimed are defined as follows:

1. A drive torque controller for use with a vehicle which has a drive wheel connected to an engine via a torque converter, comprising:

means for detecting a running state of a vehicle, means for reducing a drive torque of said drive wheel based on said running state, means for computing a slip factor of said torque converter, means for setting a lower limit of the drive torque based on said slip factor, and means for preventing said reducing means from reducing said drive torque to a value lower than the lower limit.

2. A drive torque controller as defined in claim 1, wherein said lower limit setting means comprises means for computing a road surface frictional coefficient based on said slip factor, and means for setting the lower limit according to said road surface frictional coefficient.

3. A drive torque controller as defined in claim 1, wherein said lower limit setting means comprises means for detecting racing of said drive wheel, and means for fixing the lower limit for a predetermined time from when racing is detected.

4. A drive torque controller as defined in claim 1, wherein said driving state detecting means comprises means for detecting an acceleration of said vehicle, and said lower limit setting means comprises means for computing a target drive torque based on said acceleration and means for applying a larger value of any one of said target drive torque and a lower limit of drive torque based on said slip factor, as the lower limit.

5. A drive torque controller for use with a vehicle which has a drive wheel connected to an engine via torque converter, comprising:

means for detecting a running state of said vehicle, means for calculating a target drive torque of said drive wheel based on said running state, means for controlling an engine torque so as to obtain said target drive torque, means for detecting an acceleration of said vehicle, means for detecting said engine torque, means for calculating an estimated acceleration of said vehicle on a flat road from the engine torque, and means for correcting said target drive torque based on a difference between the estimated acceleration and said acceleration detected by the acceleration detecting means so that said estimated acceleration corresponds to detected acceleration.

6. A drive torque controller as defined in claim 5, wherein said running state detecting means comprises means for detecting a rotation speed of the drive wheel, and said target drive torque calculating means comprises means for computing a feedback term of the target drive torque based on said rotation speed, means for computing a feedforward term of the target drive torque based on said acceleration, and means for obtaining the target drive torque from the sum of the feedforward term and the feedback term.

* * * * *